(12) United States Patent
Hane et al.

(10) Patent No.: US 11,699,042 B2
(45) Date of Patent: *Jul. 11, 2023

(54) PREDICTIVE NATURAL LANGUAGE PROCESSING USING SEMANTIC FEATURE EXTRACTION

(71) Applicant: OPTUM, INC., Minnetonka, MN (US)

(72) Inventors: Christopher A. Hane, Irvine, CA (US); Vijay S. Nori, Roswell, GA (US); Louis J. Rumanes, Salt Lake City, UT (US)

(73) Assignee: Optum, Inc., Minnetonka, MN (US)

( * ) Notice: Subject to any disclaimer, the term of this patent is extended or adjusted under 35 U.S.C. 154(b) by 42 days.

This patent is subject to a terminal disclaimer.

(21) Appl. No.: 17/303,680

(22) Filed: Jun. 4, 2021

(65) Prior Publication Data
US 2021/0294983 A1 Sep. 23, 2021

Related U.S. Application Data

(63) Continuation of application No. 16/253,886, filed on Jan. 22, 2019, now Pat. No. 11,055,490.

(51) Int. Cl.
*G06F 40/30* (2020.01)
(52) U.S. Cl.
CPC .................... *G06F 40/30* (2020.01)
(58) Field of Classification Search
None
See application file for complete search history.

(56) References Cited

U.S. PATENT DOCUMENTS

| 7,548,910 B1 * | 6/2009 | Chu .................... G06F 16/3338 707/999.005 |
| 7,657,521 B2 | 2/2010 | Masarie et al. |
| 7,921,011 B2 | 4/2011 | Hernandez Abrego et al. |
| 8,484,016 B2 | 7/2013 | Brockett et al. |
| 8,676,795 B1 | 3/2014 | Durgin et al. |

(Continued)

OTHER PUBLICATIONS

U.S. Appl. No. 16/253,886, filed Jan. 22, 2019, 2020-0233928.
(Continued)

*Primary Examiner* — Jonathan C Kim
(74) *Attorney, Agent, or Firm* — Alston & Bird LLP

(57) ABSTRACT

There is a need for solutions that perform predictive natural language processing with improved efficiency and/or accuracy. This need can be addressed by, for example, by identifying an indexed representation of a natural language object; obtaining a vocabulary domain associated with one or more first phrases; determining an individual frequency for each first phrase based on a count of occurrences of the first phrase in the indexed representation; identifying one or more dominant phrases of the first phrases; for each dominant phrase, identifying any dependent phrases for the first dominant phrase; determining a semantically-adjusted frequency for each dominant phrase based on the individual frequency for the dominant phrase and each individual frequency for any dependent phrase for the dominant phrase; generating a structured representation of the natural language object based on each semantically-adjusted frequency associated with a dominant phrase; and providing the structured representation for the predictive analysis.

17 Claims, 15 Drawing Sheets

(56) References Cited

U.S. PATENT DOCUMENTS

| | | | |
|---|---|---|---|
| 10,224,119 B1* | 3/2019 | Heinrich | G16H 10/60 |
| 2014/0181128 A1 | 6/2014 | Riskin et al. | |
| 2018/0046764 A1* | 2/2018 | Katwala | G16H 15/00 |
| 2018/0052961 A1* | 2/2018 | Shrivastava | G06F 16/285 |
| 2018/0089568 A1* | 3/2018 | Allen | G06N 5/02 |
| 2018/0101598 A1* | 4/2018 | Allen | G06F 40/268 |
| 2018/0285746 A1* | 10/2018 | Dunwoody | G06F 16/9535 |
| 2019/0026437 A1* | 1/2019 | Syeda-Mahmood | G06F 16/31 |
| 2020/0151246 A1* | 5/2020 | Mwarabu | G06F 18/214 |
| 2020/0233928 A1* | 7/2020 | Hane | G06F 40/30 |
| 2020/0311638 A1* | 10/2020 | Kumar | G06Q 10/06315 |
| 2021/0183526 A1* | 6/2021 | Bader | G16H 50/70 |
| 2021/0303795 A1* | 9/2021 | Barker | G06F 40/242 |
| 2021/0383063 A1* | 12/2021 | Moriya | G06F 40/30 |

OTHER PUBLICATIONS

Jin, Chun-Xia et al. "Text Clustering Algorithm Based On The Graph Structures of Semantic Word Co-Occurrence," In 2016 International Conference on Information System and Artificial Intelligence (ISAI), Jun. 24, 2016, pp. 497-502, DOI: 10.1109/ISAI.2016.0112.

NonFinal Office Action for U.S. Appl. No. 17/303,278, dated Oct. 25, 2022, (18 pages), United States Patent and Trademark Office, US.

"How Omnichannel Routing Enables Seamless Customer Experiences," Genesys, (2017), pp. 1-7.

Zou et al. "IndexFinder: A Method of Extracting Key Concepts From Clinical Texts For Indexing," AMIA Annual Symposium Proceedings, American Medical Informatics Association, (2003), pp. 763-767, [online], [retrieved Apr. 22, 2019], [retrieved Apr. 22, 2019], retrieved from the Internet <URL: https://www.ncbi.nlm.nih.gov/pmc/articles/PMC1480259/>.

NonFinal Office Action for U.S. Appl. No. 17/303,679, dated Oct. 26, 2022 (19 pages), United States Patent and Trademark Office, US.

Notice of Allowance and Fee(s) Due for U.S. Appl. No. 17/303,678, dated Feb. 21, 2023, United States Patent and Trademark Office, US.

Notice of Allowance and Fee(s) Due for U.S. Appl. No. 17/303,679, dated Mar. 1, 2023, (11 pages), United States Patent and Trademark Office, US.

* cited by examiner

404

901

CREATE A GRAPH WHERE EACH DOMINANT PHRASE IS A NODE

902

CREATE A DIRECTED EDGE FROM EACH FIRST NODE FOR A FIRST PHRASE TO ANY SECOND NODE FOR A SECOND PHRASE THAT IS A NEIGHBOR PHRASE FOR THE FIRST PHRASE

903

SUBTRACT THE INDIVIDUAL FREQUENCY COUNT FOR THE PHRASE FROM THE INDIVIDUAL FREQUENCY ANY DEPENDENT PHRASES FOR THE PHRASE

} FOR EACH DOMINANT PHRASE OF SIZE N...1

FIG. 9

| PERMUTATION 1101 | SIZE 1102 | NEIGHBOR PHRASES 1103 | INDIVIDUAL FREQUENCY 1104 | SEMANTIC FREQUENCY 1105 |
|---|---|---|---|---|
| A | 1 | AB | 20 | 15 |
| B | 1 | AB, BC | 20 | 7 |
| C | 1 | BC | 40 | 32 |
| D | 1 | NULL | 10 | 10 |
| AB | 2 | ABC | 5 | 3 |
| BC | 2 | ABC | 8 | 6 |
| ABC | 3 | NULL | 2 | 2 |

| | A | B | C | AB | BC | CD | ABC | EF | GH | | | |
|---|---|---|---|----|----|----|-----|----|----|---|---|---|
| 1501 | 15 | 7 | 32 | 10 | 3 | 6 | 2 | 0 | 0 | . | . | . |
| 1502 | 11 | 4 | 3 | 8 | 2 | 0 | 0 | 0 | 0 | . | . | . |

FIG. 15

PREDICTIVE NATURAL LANGUAGE PROCESSING USING SEMANTIC FEATURE EXTRACTION

CROSS-REFERENCE TO RELATED APPLICATIONS

This application claims priority to U.S. patent application Ser. No. 16/253,886, filed Jan. 22, 2019, the contents of which are hereby incorporated herein in its entirety by reference.

BACKGROUND

Objects, like medical notes, can provide valuable data for predictive data analysis. For example, natural language medical notes by a medical provider can provide valuable data that can be used to predict health conditions of an individual. However, many natural language processing solutions suffer from problems related to a failure to perform feature extraction from natural language objects in a manner that is both efficient and provides useful features for data analysis. For example, many existing natural language processing systems fail to capture data that represents conceptual features of natural language objects. Moreover, various natural language objects are very inefficient for processing large amounts of natural language object data. Thus, there is a need for improvements in the accuracy and/or efficiency of natural language processing systems, such as the accuracy and/or efficiency of feature extraction in natural language processing systems.

BRIEF SUMMARY

In general, embodiments of the present invention provide methods, apparatus, systems, computing devices, computing entities, and/or the like for predictive natural language processing using semantic feature extraction. Certain embodiments utilize systems, methods, and computer program products that enable a natural language processing system with improved accuracy.

In accordance with one aspect, a method is provided. In one embodiment, the method comprises identifying an indexed representation of the first natural language object; determining an individual frequency for each of one or more dominant phrases in the first natural language object; determining a semantically-adjusted frequency for each first dominant phrase of the one or more dominant phrases based on the individual frequency for the first dominant phrase and each individual frequency for any dependent phrase for the first dominant phrase, wherein, if the first dominant phrase is associated with any dependent phrases: (i) the first dominant phrase includes each dependent phrase for the first dominant phrase and is larger in size than each dependent phrase for the first dominant phrase, and (ii) each dependent phrase for the first dominant phrase is a second dominant phrase of the one or more dominant phrases; generating a first structured representation of the first natural language object based on each semantically-adjusted frequency associated with a third dominant phrase of the one or more dominant phrases; and providing the first structured representation for the predictive analysis.

In accordance with another aspect, a computer program product is provided. The computer program product may comprise at least one computer-readable storage medium having computer-readable program code portions stored therein, the computer-readable program code portions comprising executable portions configured to identify an indexed representation of the first natural language object; determine an individual frequency for each of one or more dominant phrases in the first natural language object; determine a semantically-adjusted frequency for each first dominant phrase of the one or more dominant phrases based on the individual frequency for the first dominant phrase and each individual frequency for any dependent phrase for the first dominant phrase, wherein, if the first dominant phrase is associated with any dependent phrases: (i) the first dominant phrase includes each dependent phrase for the first dominant phrase and is larger in size than each dependent phrase for the first dominant phrase, and (ii) each dependent phrase for the first dominant phrase is a second dominant phrase of the one or more dominant phrases; generate a first structured representation of the first natural language object based on each semantically-adjusted frequency associated with a third dominant phrase of the one or more dominant phrases; and provide the first structured representation for the predictive analysis.

In accordance with yet another aspect, an apparatus comprising at least one processor and at least one memory including computer program code is provided. In one embodiment, the at least one memory and the computer program code may be configured to, with the processor, cause the apparatus to identify an indexed representation of the first natural language object; determine an individual frequency for each of one or more dominant phrases in the first natural language object; determine a semantically-adjusted frequency for each first dominant phrase of the one or more dominant phrases based on the individual frequency for the first dominant phrase and each individual frequency for any dependent phrase for the first dominant phrase, wherein, if the first dominant phrase is associated with any dependent phrases: (i) the first dominant phrase includes each dependent phrase for the first dominant phrase and is larger in size than each dependent phrase for the first dominant phrase, and (ii) each dependent phrase for the first dominant phrase is a second dominant phrase of the one or more dominant phrases; generate a first structured representation of the first natural language object based on each semantically-adjusted frequency associated with a third dominant phrase of the one or more dominant phrases; and provide the first structured representation for the predictive analysis.

BRIEF DESCRIPTION OF THE SEVERAL VIEWS OF THE DRAWINGS

Figure 1:
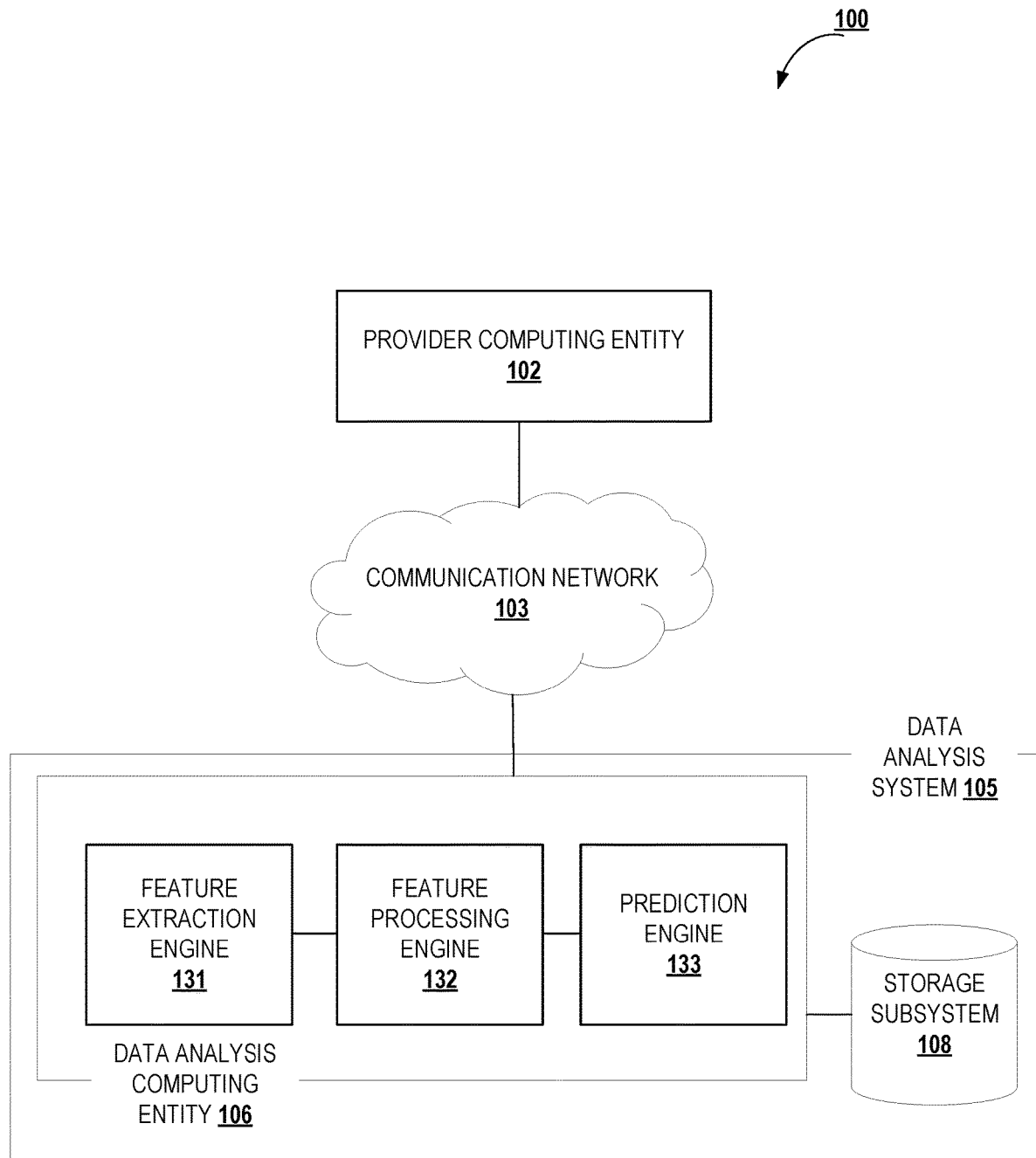

Having thus described the invention in general terms, reference will now be made to the accompanying drawings, which are not necessarily drawn to scale, and wherein:

FIG. 1 is an exemplary overview of an architecture that can be used to practice embodiments of the present invention.

Figure 2:
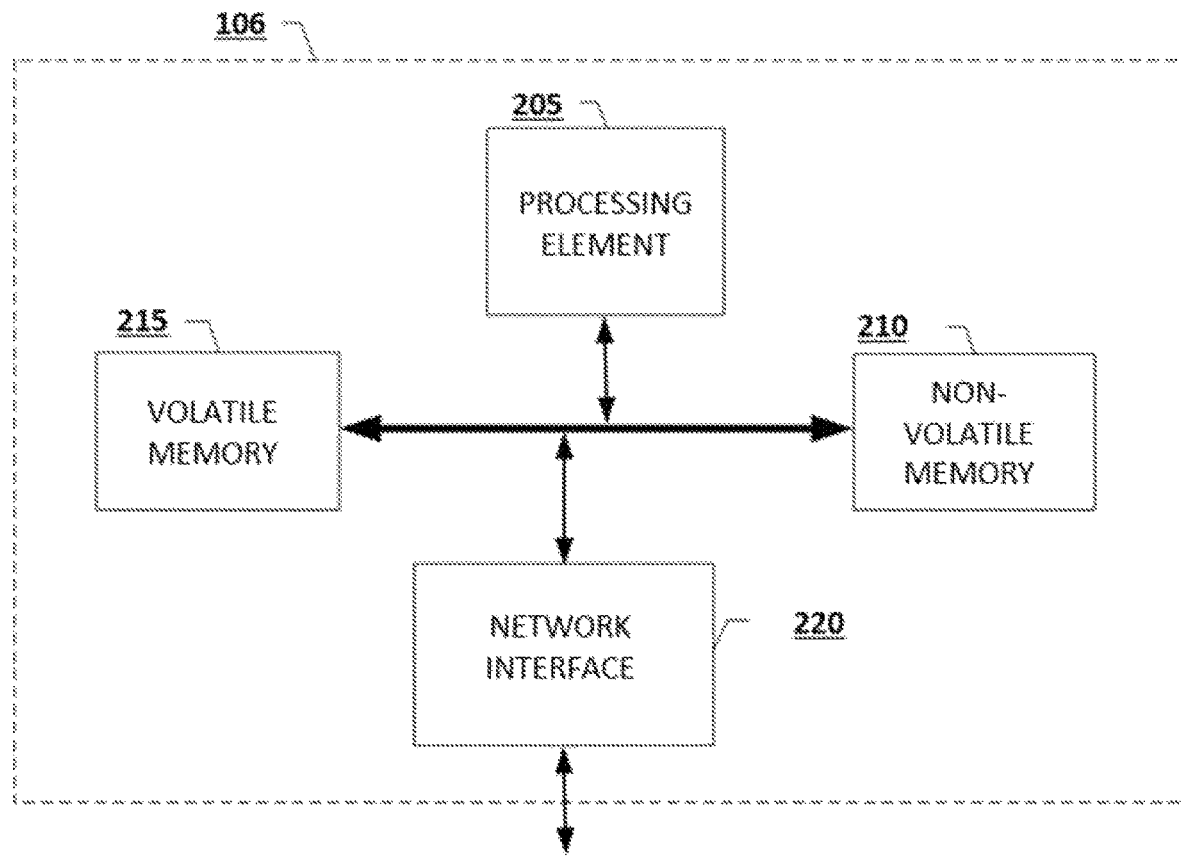

FIG. 2 illustrates an example data analytics computing entity in accordance with some embodiments discussed herein.

Figure 3:
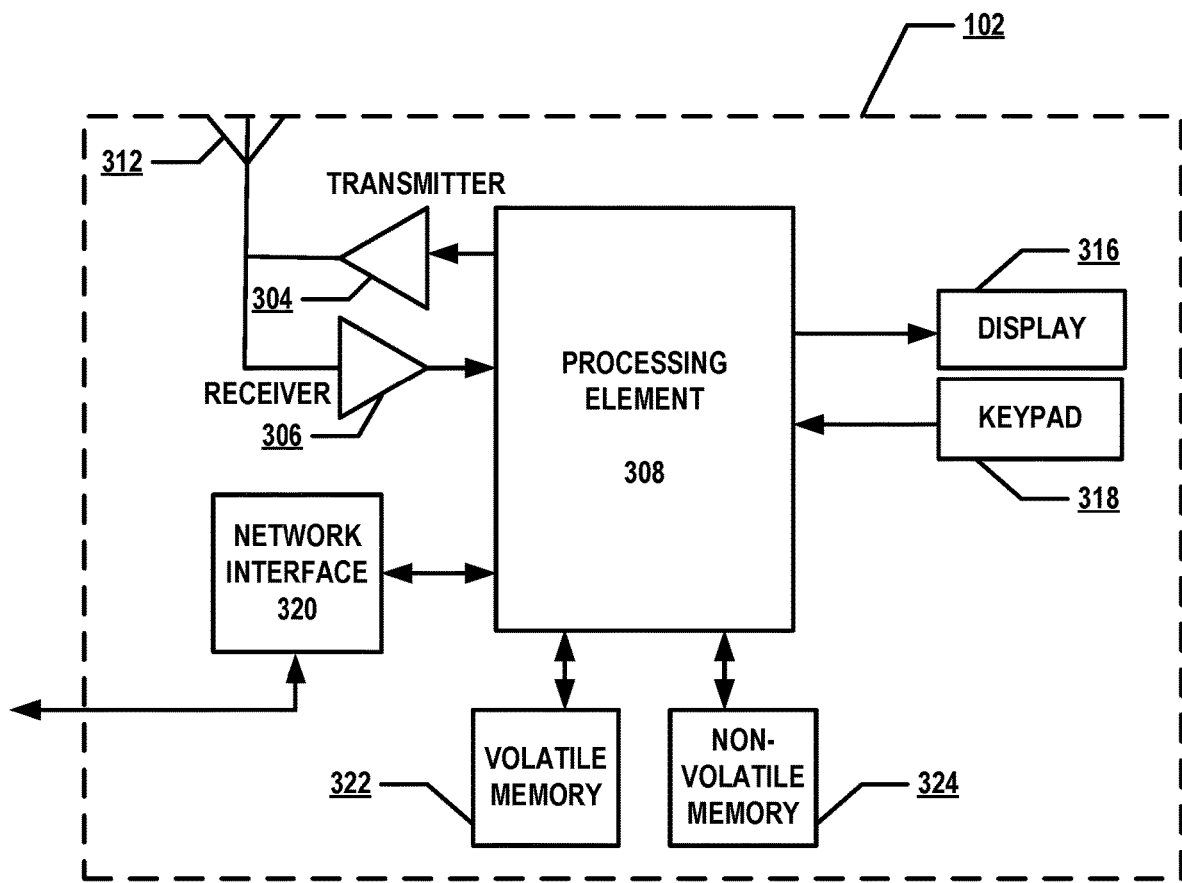

FIG. 3 illustrates an example provider computing entity in accordance with some embodiments discussed herein.

Figure 4:
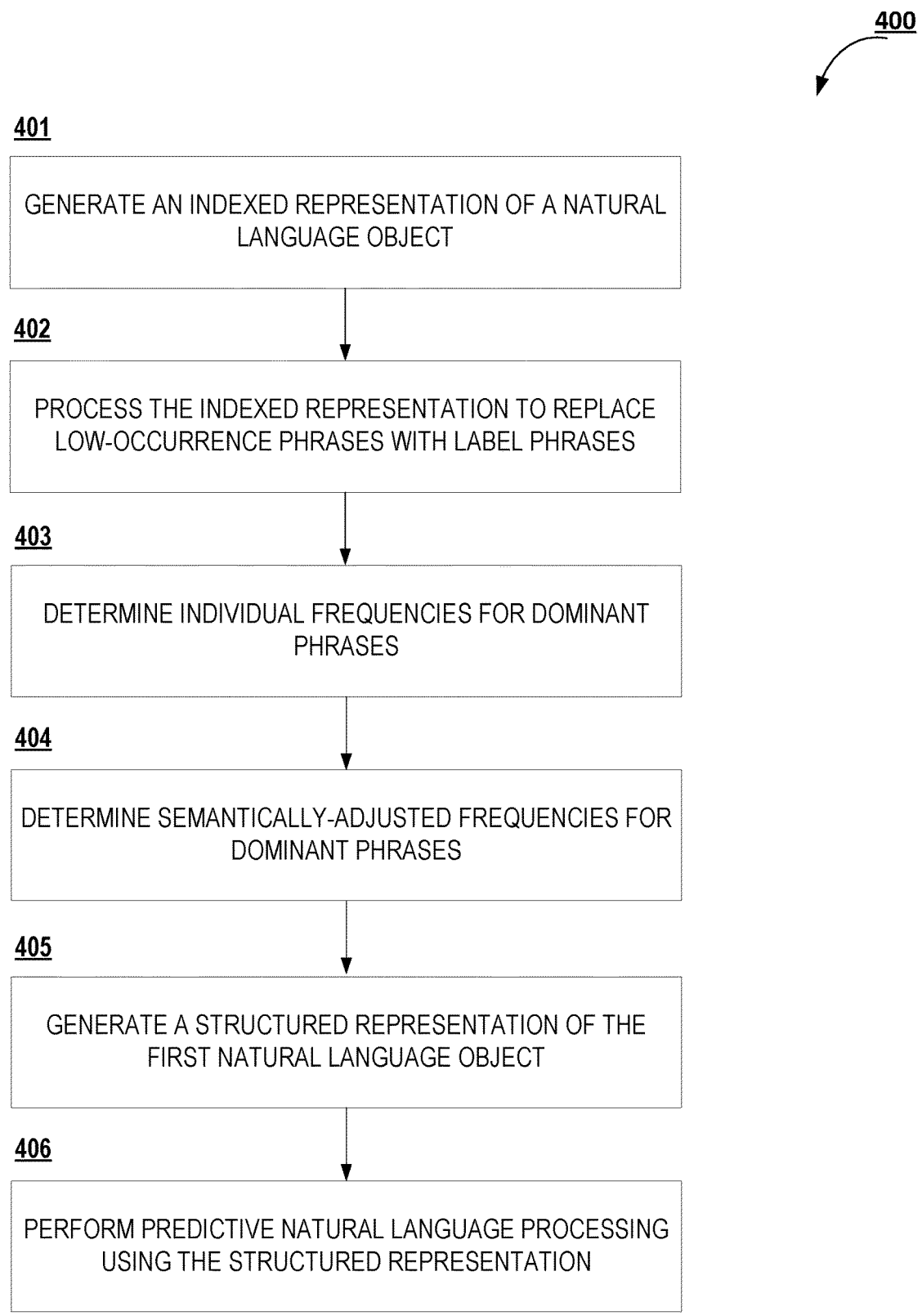

FIG. 4 depicts a flowchart diagram of a process for performing predictive natural language processing using semantic feature extraction in accordance with some embodiments discussed herein.

Figure 5:
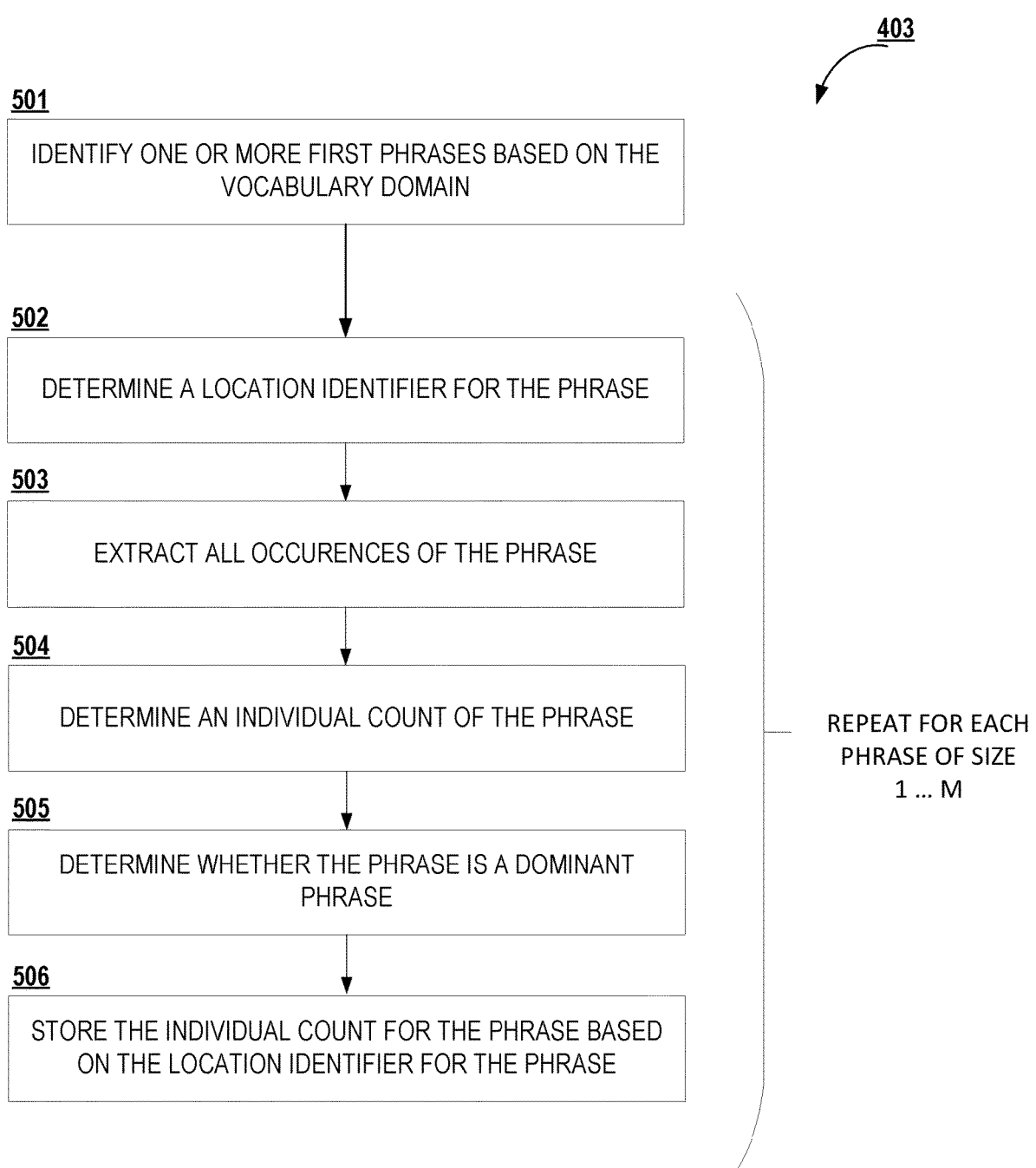

FIG. 5 depicts a flowchart diagram of a process for determining individual frequencies for dominant phrases in accordance with some embodiments discussed herein.

Figure 6:
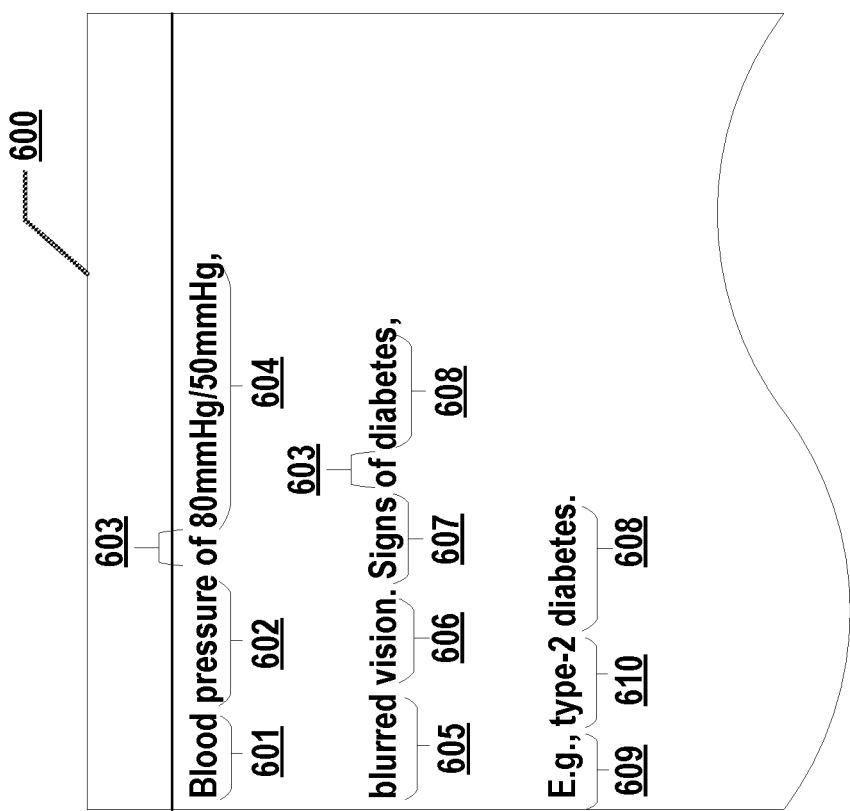

FIG. 6 provides an operational example of a natural language object in accordance with some embodiments discussed herein.

Figure 7B:
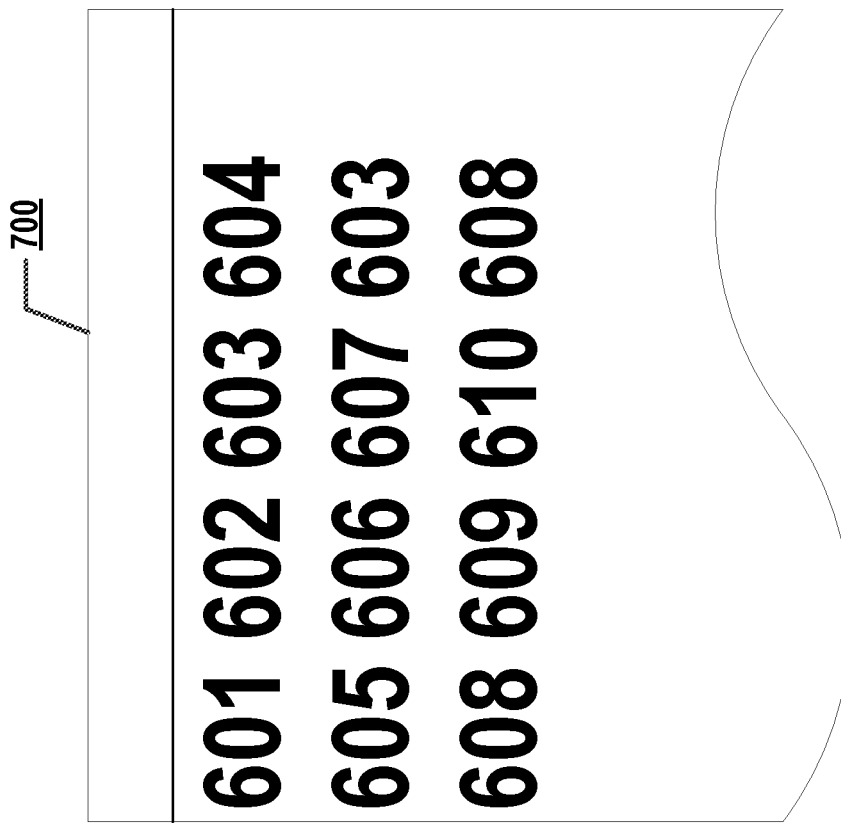
Figure 7A:
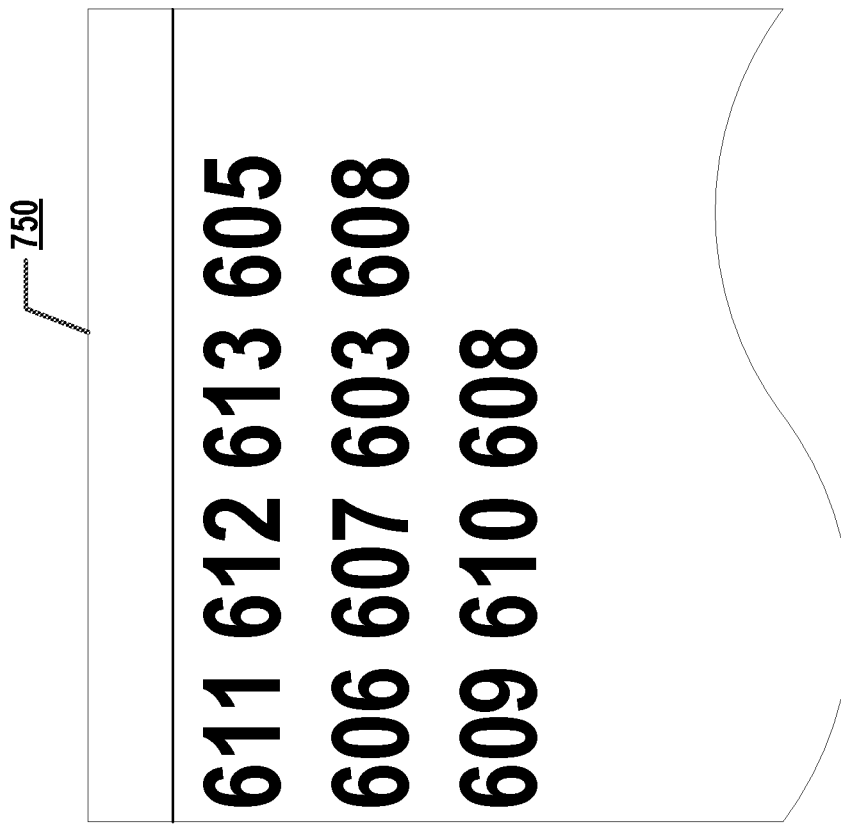

FIGS. 7A-7B provide operational examples of indexed representations of two natural language objects in accordance with some embodiments discussed herein.

Figure 8:
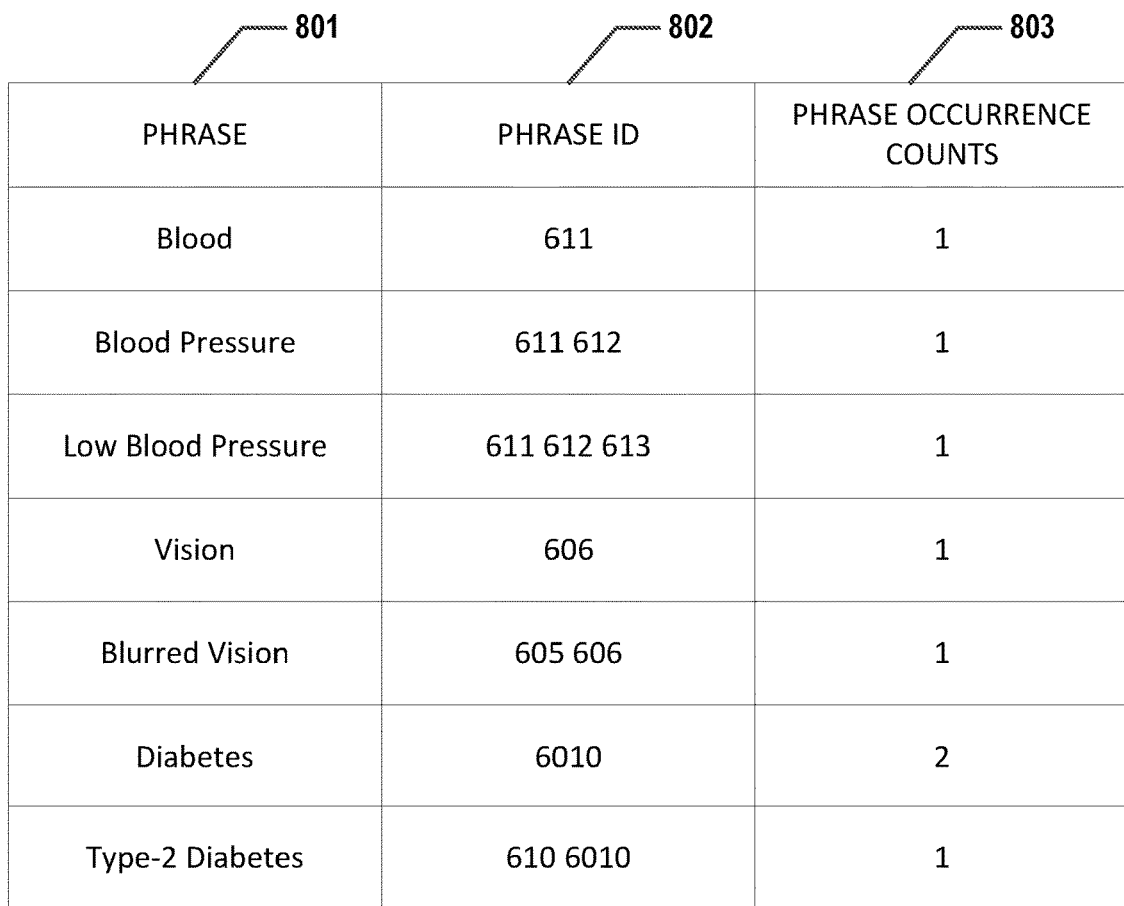

FIG. 8 provides an operational example of a phrase data table in accordance with some embodiments discussed herein.

FIG. 9 depicts a flowchart diagram of an example process for determining semantically adjusted frequencies in accordance with some embodiments discussed herein.

Figure 10:
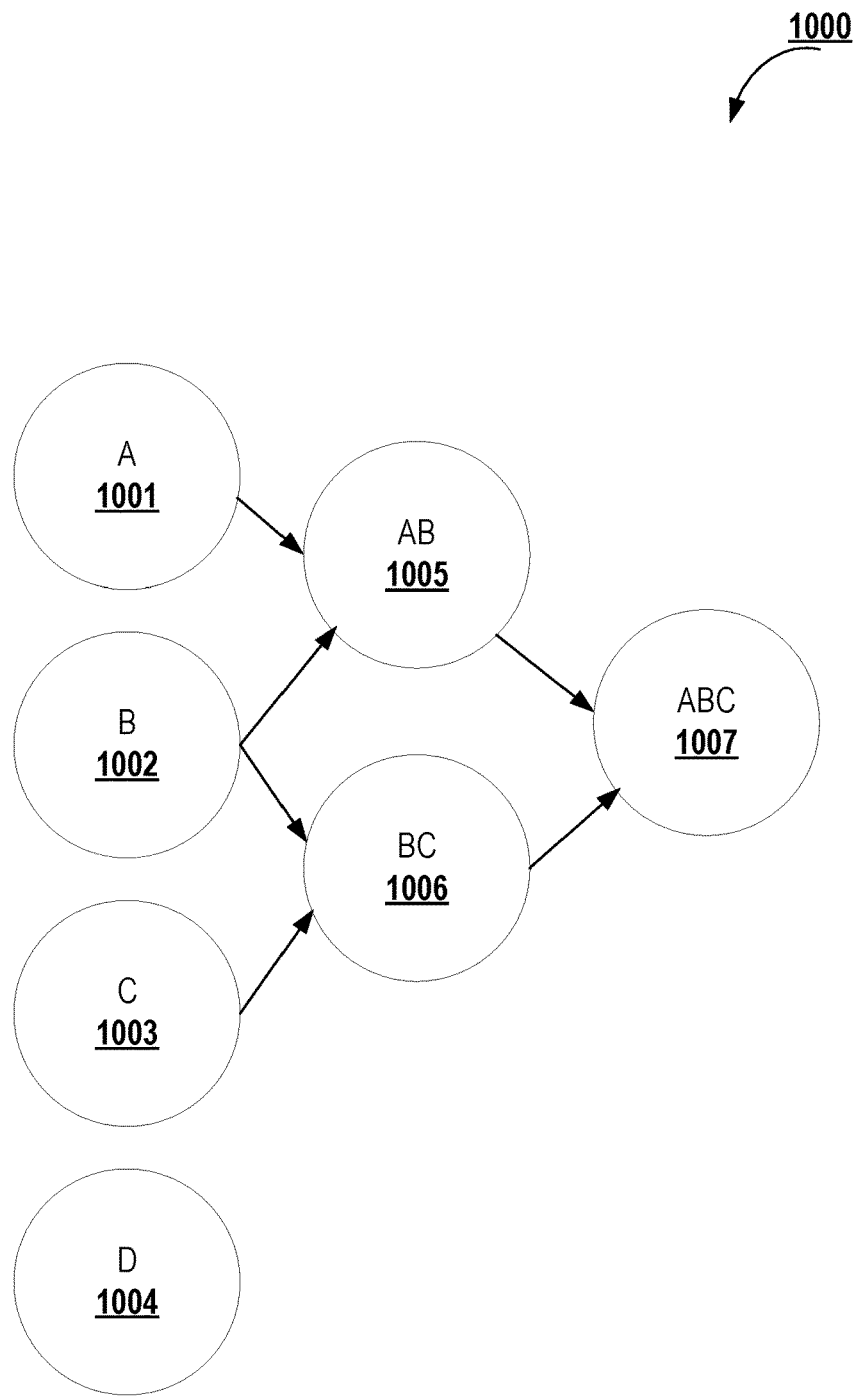

FIG. 10 provides an operational example of a semantic relationship graph in accordance with some embodiments discussed herein.

FIG. 11 provides an operational example of a semantic adjustment table in accordance with some embodiments discussed herein.

Figure 12:

FIG. 12 provides an operational example of a hash storage table in accordance with some embodiments discussed herein.

Figure 13:
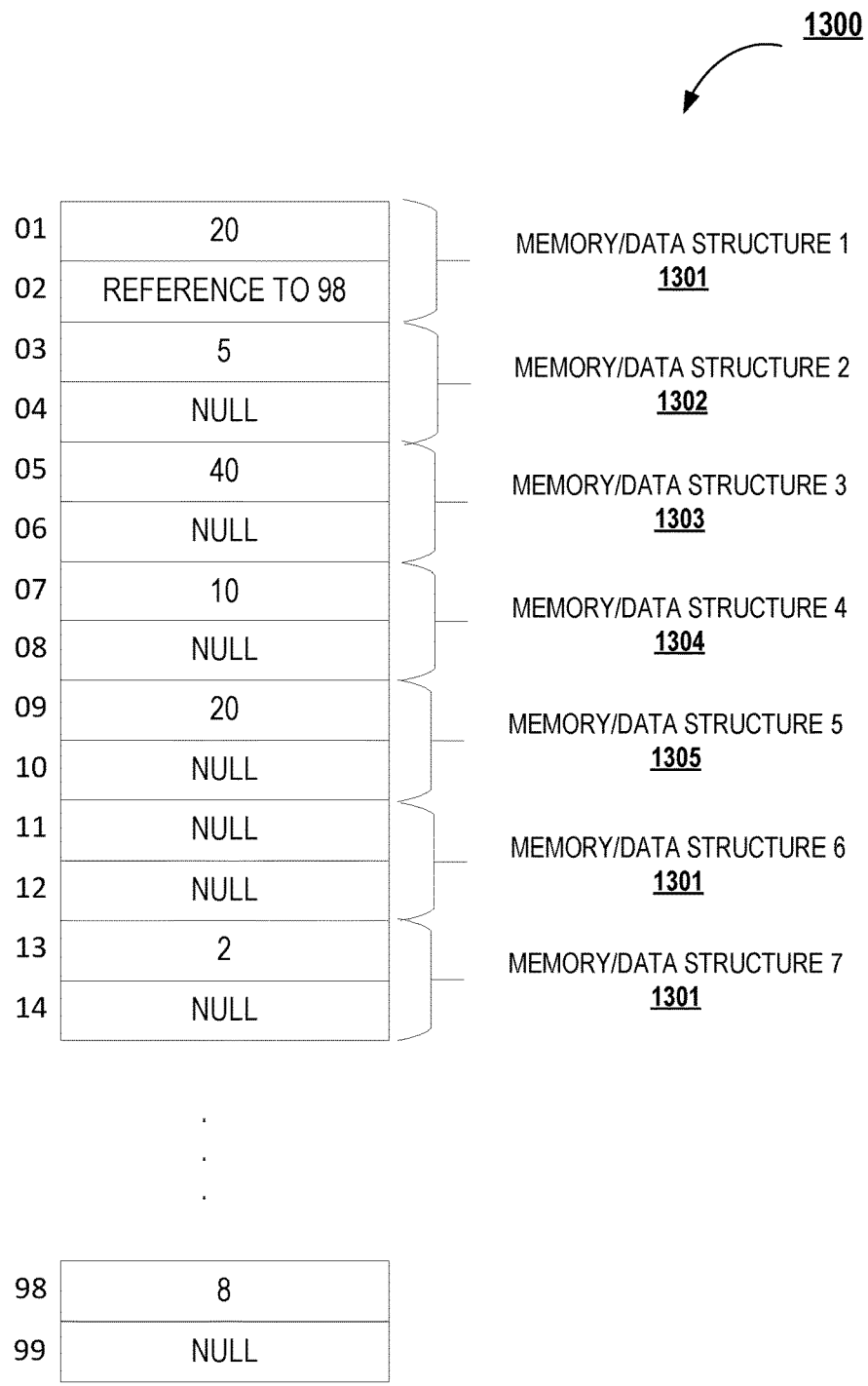

FIG. 13 provides an operational example of a computer-readable storage media in accordance with some embodiments discussed herein.

Figure 14:
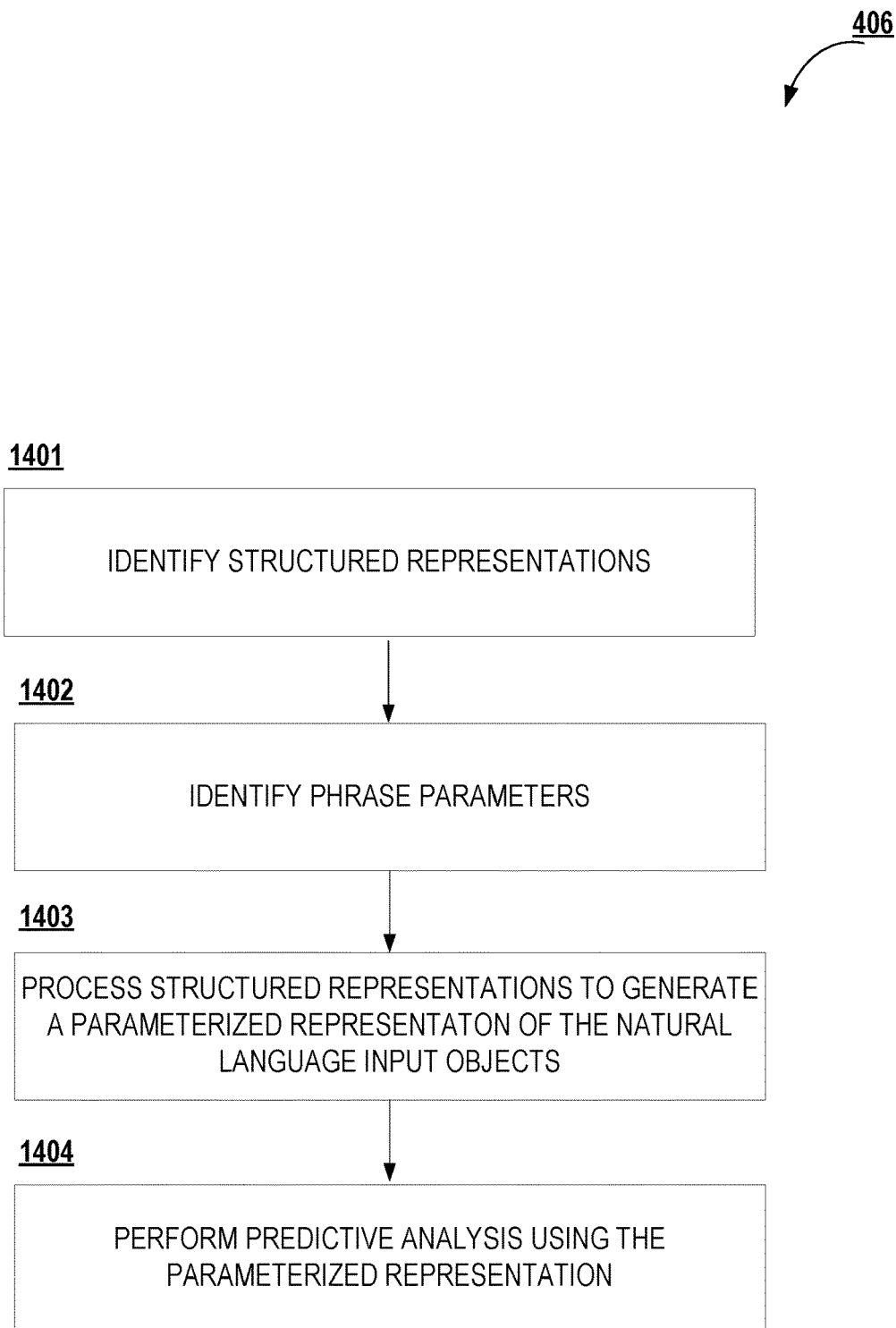

FIG. 14 depicts a flowchart diagram of an example process for predictive natural language processing in accordance with some embodiments discussed herein.

FIG. 15 provides an operational example of an aggregate structured representation in accordance with some embodiments discussed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. OVERVIEW

Discussed herein methods, apparatus, systems, computing devices, computing entities, and/or the like for predictive natural language processing using semantic feature extraction. As will be recognized, however, the disclosed concepts can be used to perform any type of natural language processing and are not limited to a particular context.

A. Technical Problems

Objects, like medical notes, can provide valuable data for predictive data analysis. For example, medical notes can provide valuable data that can be used to predict health conditions of an individual. However, many natural language objects suffer from problems related to structural imprecision of such objects. For example, a natural language processing system may fail to extract conceptual and/or semantic features from natural language objects that can be very useful to a trained machine learning model. Moreover, natural language processing systems may be inefficient because of over-extraction of features, some of which may not have much predictive significance for a trained machine learning model.

One aspect of the structural imprecision of natural language objects relates to lexical diversity of such inputs. For example, in natural language objects, different concepts can be expressed in different ways and using different terms and phrases. Because of this lexical diversity, natural language processing systems may fail to detect some relevant and useful semantic structures of natural language objects. The failure to detect the semantic structures in turn complicates accuracy of conceptual inferences made from natural language objects by natural language processing systems.

For example, in the medical context, different providers and different practitioners may use different words and phrases to express similar or identical concepts. The terminology used by a single department or institution may differ from the terminology used by another department or institution. Adding to the problems posed by terminological variety are some other problems posed by variety in numeric values. Marginal differences between numbers, such as a marginal difference of 0.4 mmHg between two blood pressure values, may have little conceptual significance for a predictive data analysis module. However, natural language processing systems may have difficulty extracting such conceptually sophisticated features from natural language objects. As will be recognized, the medical context is an environment with abundant natural language objects and a significant need for predictive data analysis, but where the natural language objects suffer from substantial lexical diversity complications, such as complications related to terminological variety and numeric variety.

Moreover, many existing natural language processing systems are very inefficient for processing large amounts of natural language object data. This is in part because of inefficient feature extraction in those systems. To extract features from natural language objects, many existing natural language processing systems perform time-consuming text processing on natural language objects to detect occurrence of a large domain of linguistic features, e.g., words, in those natural language objects. The real-world cost of such time-consuming procedures is more significant in contexts where a natural language processing system is tasked with processing large amounts of data. An example of such a context is the medical context, where a natural language processing system may be tasked with performing predictive natural language processing on a large batch of medical notes to determine one or more predictions about the health of one or more patients. Thus, many existing natural language processing systems may be ill-suited for many applications in the medical context, for example for performing predictive data analysis on large batches of medical notes.

In many instances, some of the features extracted through computationally complex and/or time-consuming processes will end up having little significance to understanding conceptual structures of natural language objects. In this way, the problems posed by over-extraction of relevant features from natural language objects could be two-fold: such feature extraction can at the same time reduce efficiency of a natural language processing systems by making those systems more time-consuming and reduce accuracy of such systems by supplying irrelevant, misleading, and/or insignificant features. Because of those problems, many existing natural language processing systems are not properly adapted to perform accurate and/or efficient predictions from natural language objects, e.g., predict health of a patient based on natural language medical notes.

B. Technical Solutions

Various embodiments of the present invention address the technological problems associated with the efficiency and accuracy of predictive natural language analysis by extracting features from natural language objects in accordance with semantic structures of objects. For example, in some embodiments, a natural language processing system extracts features from a natural language object based on occurrence frequencies of particular terms in the inputs and adjustments to those occurrence frequencies based on semantic dependencies between the particular terms. The semantic relationships used to adjust occurrence frequencies of terms may, for example, be inferred from lexical relationships between terms of those terms. For example, the system may infer that the term "low blood pressure" has a semantic dependency relationship with the terms "blood" and "blood pressure" based on the fact that the term "low blood pressure" is lexically inclusive of the terms "blood" and "blood pressure." The system may then adjust the frequency of the noted terms "blood" and "blood pressure" based on the frequency of the noted term "low blood pressure." For example, if the noted term "blood pressure" occurs ten times but the noted term "low blood pressure" occurs twice, the system may adjust the frequency of the noted term "blood pressure" to eight (e.g., ten minus two). The system may then generate features for a natural language object that includes the particular noted terms based on the adjusted occurrence frequencies of the noted terms, such as the adjusted occurrence frequency of two for the noted term "blood pressure."

Intuitive inferences and confirmatory observations both demonstrate that using semantically-adjusted occurrence frequencies to extract features used for natural language processing can vastly improve efficiency and/or accuracy of such processing. This is in part because of a correlation between lexical complexity and semantic specificity of terms in many contexts. Typically, more lexically dependent phrases indicate more specific, and thus likely more valuable, features of natural language objects. For example, in the example noted above, the term "low blood pressure" (which indicates a particular symptom) is likely more indicative of a feature pertaining to patient health than the terms "blood" and "blood pressure" (which fail to indicate any particular symptoms). Because of the correlations between lexical complexity of terms and their semantic value, a natural language processing system can extract better and more informative features from natural language objects if such a natural language processing system adjusts the occurrence frequencies of the terms based on semantic dependency relationships inferred from lexical decency relationships.

For example, as described above with respect to the terms "blood pressure" and "low blood pressure," a natural language system can adjust (e.g., reduce) the occurrence frequency of the term AB based on the occurrence frequency of the term ABC, in accordance with various embodiments of the present invention. The semantically adjusted frequency of AB is likely a better input for feature extraction than the raw frequency of AB. This is because the natural language processing system already accounts for occurrences of AB within ABC within the computed occurrence frequency of ABC, a feature likely to be more informative for natural language processing. Thus, if the natural language processing system were to use a raw occurrence frequency of the term AB for feature extraction, it would double-count some the occurrences of AB within ABC and therefore produce less informative features. In this way, by using semantically-adjusted features such as semantically-adjusted frequencies, various embodiments of the present invention address the technological problems associated with accuracy of predictive natural language analysis.

In addition, various embodiments of the present invention identify frequencies and detect semantic relationships based on vocabulary domains particular to a natural language object. As noted above, feature extraction is an efficiency bottleneck of many existing natural language processing systems, as those systems perform complex text processing routines to extract features related to large domain of terms. As further noted above, such systems may also over-extract features, a result which, in turn, may undermine the accuracy of natural language processing. In contrast, various embodiments of the present invention limit text processing to frequency extraction characterized by a limited vocabulary domain, where such a domain may be specific to a field, department, institution, etc. Such limited text processing can address both accuracy challenges related to over-extraction of features as well as efficiency challenges related to time-consuming text processing.

To further reduce text processing time, various embodiments of the present invention perform text processing using an indexed representations of a natural language object. For example, the system may convert a natural language object including n terms tom word identifiers, where m could be less than n and where the word identifiers may be numeric values. Generating an indexed representation may further include replacing at least some text terms and/or numeric values with labels (comprising terms) that are then indexed to word identifiers. By way of example, the numeric values "80 mmHg/50 mmHg" may be replaced with the terms "low blood pressure," and the terms "low," "blood, and "pressure" may be indexed with respective word identifiers. Thus, various embodiments of the present invention perform preprocessing on a natural language object before frequency detection in order to reduce computational complexity of text processing. Such preprocessing can turn frequency detection within the context of a natural language object into a numeric pattern matching problem, where the system detects occurrences of a first ordered combination of numbers in a second ordered combination of numbers and where the first ordered combination is a subset of a defined domain of ordered combinations of numbers.

Moreover, various embodiments of the present invention further increase efficiency of natural language processing by storing feature values within and retrieving feature values from a hashed data structure. Various natural language processing systems, such as various embodiments of the present invention, rely on repeated storage and/or retrieval of features extracted from natural language objects. An example of such features are frequency-based features that indicate occurrence frequencies of terms in objects and thus can be of significance to effective feature extraction from natural language objects. Hashed data structures are useful for natural language processing systems that rely on repeated storage and/or retrieval of feature values, as such hashed data structures allow for computationally efficient storage and retrieval, e.g., retrieval of values in constant time.

However, various natural language processing systems fail to utilize hashed data structures for storage and retrieval of feature values, in part because at least some of those natural language processing systems retrieve an excessively large and/or an insufficiently defined number of features. In contrast, various embodiments of the present invention rely on hashed data structures to store and retrieve frequency-based feature values extracted based on occurrence frequencies of limited domains of terms in natural language objects. In doing so, various embodiments of the present invention address problems related to efficiency of natural language processing systems by decreasing computational cost of retrieving and storing feature values in those natural language processing systems.

Overall, various embodiments of the present invention improve efficiency of natural language processing systems. This may enable faster natural language processing, such as real-time natural language processing. For example, various embodiments of the present invention enable processing a natural language object in real-time (e.g., upon submission of a medical note by a provider). This may in turn enable faster predictions based on natural language objects, which may trigger more effective and responsive action, as well as a request for any missing information from an information provider at a time substantially close to a time of information entry, which may increase a likelihood of response by the provider.

II. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. EXEMPLARY SYSTEM ARCHITECTURE

The architecture 100 includes a provider computing entity 102 that interacts with a data analytics system 105 via a computer network 103. The data analytics system 105 includes a storage subsystem 108 and a data analysis computing entity 106. The data analysis computing entity 106 includes a feature extraction engine 131, a feature processing engine 132, and a feature prediction engine 133. Each computing entity and/or computing system in the architecture 100 may include any suitable network server and/or other type of processing device. The communication network 103 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.).

The architecture 100 may be used to perform various data analytics tasks, such as predictive natural language processing. For example, the provider computing entity 102 may provide a natural language object (e.g., any combination of one or more words, such as a combination of words in a document, where a word may in turn be a combination of one or more alphanumeric characters, e.g., "blood," "87," etc.) to the data analytics system 105 and receive a prediction corresponding to the natural language object from the data analytics system. The provider computing entity 102 may be a computing entity associated with a medical provider and/or a medical insurer institution. For example, the provider computing entity 102 may provide medical notes associated with a particular patient to the data analytics system 105. The data analytics system 105 may process the medical notes (e.g., in combination of one or more other medical notes) to generate a prediction about a health condition of the patient.

The storage subsystem 108 may store one or more of the following: (i) vocabulary domain data (e.g., data defining one or more phrases whose occurrence frequency in a natural language object is deemed relevant to extracting features from the natural language object); (ii) semantic relationship data (e.g., data defining one or more semantic relationships between at least some of the phrases identified in the vocabulary domain data); (iii) historic input data (e.g., data defining at least one structured representation of a previously processed natural language object); (iv) system configuration data (e.g., data defining at least one parameter of at least one component of the data analysis computing entity 106, such as at least one parameter of the feature processing engine 132 and/or at least one parameter of the feature prediction engine 133); (v) system training data (e.g., data used to train at least one parameter of at least one component of the data analysis computing entity 106, such as target output data used to train at least one parameter of the feature processing engine 132 and/or at least one parameter of the feature prediction engine 133); and (vi) historic operation data (e.g., data related to at least one past operation of the data analytics system 105).

The storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. In various embodiments, the storage subsystem 108 is configured to store a database, such as a relational database. In various embodiments, the storage subsystem 108 is configured to store a file having a preconfigured format, such as JSON format.

The feature extraction engine 131 processes a natural language object to determine one or more semantic features of the natural language object. In some embodiments, the feature extraction engine 131 determines, for each of one or more phrases defined by a vocabulary domain for a natural language object, a corresponding semantic feature for the natural language object based on a semantically-adjusted frequency of the corresponding phrase in the natural language object. For example, the feature extraction engine may determine a first feature based on a semantically-adjusted frequency of the phrase "blood" in a natural language object, a second feature based on a semantically-adjusted frequency of the phrase "blood pressure" in the natural language object, and a third feature based on a semantically-adjusted frequency of the phrase "low blood pressure" in the natural language object. To identify a vocabulary domain that indicates phrases deemed relevant to extracting features from the natural language object (e.g., such as phrases "blood," "blood pressure," and "low blood pressure"), the feature extraction engine 131 may retrieve the vocabulary domain data from the storage subsystem 108. Moreover, to identify semantic relationships between phrases, the feature extraction engine 131 may retrieve the semantic relationship data from the storage subsystem 108.

The feature processing engine 132 processes the one or more semantic features determined by the feature extraction engine 131 from the natural language object in accordance with one or more parameters to determine a parametrized representation of the natural language object. For example, the feature processing engine 132 may receive n semantic features for a particular natural language object from the feature extraction engine 131, where each semantic feature indicates a semantically-adjusted frequency of a particular phrase of one or more dominant phrases associated with the particular natural language object. The feature processing engine 132 may then retrieve (e.g., from the system configuration data in the storage subsystem 108) a feature parameter for each of the n semantic features and, for each feature, apply the retrieved feature parameter for the semantic feature to the semantically-adjusted frequency indicated by the f semantic feature to generate a respective parameterized semantic feature. The feature processing engine 132 may then combine the parameterized semantic features to generate a parameterized representation of the particular natural language object. The parameterized representation of the natural language object thus may include, for each of one or more predictive phrases associated with the structure of the parameterized representation, a respective parameterized semantic feature for the predictive phrase that resulted from applying the semantically-adjusted frequency for the predictive phrase to the phrase parameter for the phrase. The noted exemplary operations for applying phrase parameters to semantic features may be performed by a vector multiplication operation, where a first n-dimensional input vector includes the n semantic features extracted by the feature extraction engine 131 from the particular natural language object, a second n-dimensional input vector includes the corresponding n phrase parameters retrieved from the storage subsystem 108, and an output n-dimensional vector includes n parameterized semantic features characterizing the parametrized representation of the particular natural language object. The feature processing engine 132 may be trained using the training data stored in the storage subsystem 108.

The feature prediction engine 133 processes the parametrized representation of the natural language object generated by the feature processing engine 132 to determine one or more predictions (e.g., one or more medical predictions) based on the natural language object. The feature prediction engine 133 may process the parametrized representation of the natural language object along with the parameterized representations of one or more other natural language objects. The feature prediction engine 133 may use a machine learning system with one or more parameters, such a machine learning framework utilizing at least one of a logistic regression machine learning mechanism and/or a regularized regression machine learning mechanism, e.g., a Least Absolute Shrinkage and Selection Operator (LASSO) machine learning mechanism. The feature prediction engine 133 may retrieve at least some parameters of its machine learning system from the system configuration data stored in the storage subsystem 108. The feature prediction engine 133 may be trained using the training data stored in the storage subsystem 108.

A. Exemplary Data Analytics Computing Entity

FIG. 2 provides a schematic of a data analytics computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, televisions, dongles, cameras, wristbands, wearable items, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the data analytics computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the data analytics computing entity 106 may include or be in communication with one or more processing elements 205 (also referred to as processors, processing circuitry, and/or similar terms used herein interchangeably) that communicate with other elements within the data analytics computing entity 106 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the data analytics computing entity 106 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like.

The term database, database instance, database management system, and/or similar terms used herein interchangeably may refer to a collection of records or data that is stored in a computer-readable storage medium using one or more database models, such as a hierarchical database model, network model, relational model, entity-relationship model, object model, object model, semantic model, graph model, and/or the like.

In one embodiment, the data analytics computing entity 106 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the data analytics computing entity 106 with the assistance of the processing element 205 and operating system.

As indicated, in one embodiment, the data analytics computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the data analytics computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the data analytics computing entity 106 may include or be in communication with one or more input elements, such as a keyboard input, a mouse input, a touch screen/display input, motion input, movement input, audio input, pointing device input, joystick input, keypad input, and/or the like. The data analytics computing entity 106 may also include or be in communication with one or more output elements (not shown), such as audio output, video output, screen/display output, motion output, movement output, and/or the like.

As will be appreciated, one or more of the management computing entity's 100 components may be located remotely from other data analytics computing entity 106 components, such as in a distributed system. Furthermore, one or more of the components may be combined and additional components performing functions described herein may be included in the data analytics computing entity 106. Thus, the data analytics computing entity 106 can be adapted to accommodate a variety of needs and circumstances. As will be recognized, these architectures and descriptions are provided for exemplary purposes only and are not limiting to the various embodiments.

B. Exemplary Provider Computing Entity

FIG. 3 provides an illustrative schematic representative of a provider computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, RFID tags, ear pieces, scanners, televisions, dongles, cameras, wristbands, wearable items, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Provider computing entities 102 can be operated by various parties. As shown in FIG. 3, the provider computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the provider computing entity 102 may be capable of operating with one or more air interface standards, communication protocols, modulation types, and access types. More particularly, the provider computing entity 102 may operate in accordance with any of a number of wireless communication standards and protocols, such as those described above with regard to the data analytics computing entity 106. In a particular embodiment, the provider computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the provider computing entity 102 may operate in accordance with multiple wired communication standards and protocols, such as those described above with regard to the data analytics computing entity 106 via a network interface 320.

Via these communication standards and protocols, the provider computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The provider computing entity 102 can also download changes, add-ons, and updates, for instance, to its firmware, software (e.g., including executable instructions, applications, program modules), and operating system.

According to one embodiment, the provider computing entity 102 may include location determining aspects, devices, modules, functionalities, and/or similar words used herein interchangeably. For example, the provider computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information can be determined by triangulating the user computing entity's 121 position in connection with a variety of other systems, including cellular towers, Wi-Fi access points, and/or the like. Similarly, the provider computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The provider computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the provider computing entity 102 to interact with and/or cause display of information from the data analytics computing entity 106, as described herein. The user input interface can comprise any of a number of devices or interfaces allowing the provider computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the provider computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The provider computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the provider computing entity 102. As indicated, this may include a user application that is resident on the entity or accessible through a browser or other user interface for communicating with the data analytics computing entity 106 and/or various other computing entities.

In another embodiment, the provider computing entity 102 may include one or more components or functionality that are the same or similar to those of the data analytics computing entity 106, as described in greater detail above. As will be recognized, these architectures and descriptions are provided for exemplary purposes only and are not limiting to the various embodiments.

IV. EXEMPLARY SYSTEM OPERATION

The operation of various embodiments of the present invention will now be described. As discussed herein, various embodiments are directed to methods, apparatus, systems, computing devices, computing entities, and/or the like for predictive natural language processing using semantic feature extraction. In various embodiments, features used for natural language processing are generated by semantically adjusting occurrence frequencies of phrases in natural language objects based on semantic dependency relationships. Through disclosed techniques, such as semantically-adjusted feature extraction, various embodiments of the present invention disclose natural language processing systems with improved accuracy and/or efficiency.

FIG. 4 depicts a flowchart diagram of a process 400 for performing natural language processing using semantic feature extraction. The process 400 may be performed by a system of one or more computers, such as the data analytics system 105. Via the various operations of process 400, the system can extract semantically-adjusted features from natural language objects.

The process 400 begins at step/operation 401 by generating an indexed representation of a natural language object. For example, the feature extraction engine 131 may generate the indexed representation of the natural language object by: (i) identifying the natural language object; (ii) identifying one or more linguistic constructs (e.g., words) in the natural language object; (iii) for each linguistic construct of the one or more linguistic constructs in the natural language object, determining a construct identifier (e.g., a word identifier, such as a numeric word identifier); and (iv) generating the indexed representation of the natural language object that includes the construct identifier for each linguistic construct in the natural language object in an order defined by the order of the linguistic constructs in the natural language object.

The natural language object may be any portion of natural language data, such as one or more words corresponding to a medical notes document (e.g., natural language object) and/or medical notes for a particular medical session. The feature extraction engine 131 may identify one or more words in the natural language object by parsing the natural language object, e.g., by parsing the natural language object based on the presence of one or more spacer characters in the natural language object and/or based on a dictionary that defines a domain of words in a particular language. Identifying words in a natural language object may include determining one or more contextual properties associated with the natural language object, such as a language property associated with the natural language object.

FIG. 6 provides an example natural language object 600. The natural language object 600 depicted in FIG. 6 includes twelve words, each with a respective word identifier. Those twelve words include: a word (e.g., "blood") having the word identifier 601, a word (e.g., "pressure") having a word identifier 602; words (e.g., "of" on the first line and the second line) having the word identifier 603; a word (e.g., "80 mmHg/50 mmHg") having a word identifier 604; a word (e.g., "blurred") having a word identifier 605; a word (e.g., "vision") having a word identifier 606; a word (e.g., "Signs") having a word identifier 607; words (e.g., "diabetes" on the second line and third line) having a word identifier 608; a word (e.g., "E.g.,") having a word identifier 609; and a word (e.g., "Type-2") having a word identifier 610. FIG. 7A depicts an indexed representation 700 of the natural language input object 600 that includes each word identifier associated with a word in the natural language input segment 600 in an order of the words in the natural language input segment 600.

At step/operation 402, the feature extraction engine 131 processes the indexed representation to replace word identifiers associated with phrases identified as likely to occur with a low frequency (e.g., low-occurrence phrases) with word identifiers associated with phrases deemed conceptually equivalent to low-occurrence phrases but identified as likely to occur with a relatively higher frequency (e.g., label phrases). For example, the feature extraction engine 131 may determine that a particular phrase is a low-occurrence phrase because the phrase includes a numeric value that is unlikely to occur with numeric precision with sufficiently high frequency. The feature extraction engine 131 may replace a combination of word identifiers associated with the low-occurrence phrase with a combination of word identifiers associated with a label phrase that is deemed conceptually equivalent to the low-occurrence phrase. Phrases that include numeric values, such as test result values, are examples of phrases that some feature extraction engines 131 may identify as low-occurrence phrase.

For example, the feature extraction engine 131 may replace word identifiers associated with a low-occurrence phrase that includes a numeric test result with word identifiers for an equivalent label phrase that describes the test result. FIG. 7B depicts an example of such a transformation. FIG. 7B depicts indexed representation 750, which is a transformed version of the indexed representation 700. To generate the indexed representation 750, the feature extraction engine 131 has replaced word identifiers 601-604 (corresponding to the phrase "blood pressure of 80 mmHg/50 mmHg") with word identifiers 611-613 (corresponding to the phrase "low blood pressure," where "low" has a word identifier of 611, "blood" has a word identifier of 612, and "pressure" has a word identifier of 613).

At step/operation 403, the feature extraction engine 131 determines an individual frequency for each of one or more dominant phrases in the natural language input object. In some embodiments, the one or more dominant phrases are selected from one or more first phrases, wherein the one or more first phrases are determined based on a vocabulary domain associated with the natural language input segment. The vocabulary domain associated with the natural language object may indicate one or more phrases whose occurrence frequency in a natural language object is deemed relevant to extracting features from the natural language object. In some embodiments, the feature extraction engine 131 may retrieve (e.g., from the storage subsystem 108) a particular vocabulary domain for a natural language object based on a property (e.g., content type, author identifier, originating institution identifier, etc.) associated with the natural language object.

In some embodiments, the steps/operations performed as 403 of FIG. 4 are represented in more detail in FIG. 5. As depicted in FIG. 5, after identifying one or more phrases based on the vocabulary domain (step/operation 502), the feature extraction engine 131 performs steps/operations 502-506 for each phrase of size X, where X changes from 1 to M and where the size of a phrase may be defined based on the number of words in the phrase. In other words, the feature extraction engine performs an iteration of steps/operations 502-506 first for each phrases of one or more phrases having size 1, then for each phrase of one or more phrases having size 2, and so on for incremental values of X until X reaches M. For example, if the first phrases include three phrase of size one (e.g., A, B, C), two phrases of size two (e.g., AB, BC), and one phrase of size three, the feature extraction engine 131 may determine the individual frequencies (IF) of the noted six phrases in the following order: for X=1, IF(A)→IF(B)→IF(C); then for X=1+1=2, IF(AB)→IF(BC); and then for X=2+1=3, IF(ABC). The value of M may be determined based on a size of a longest phrase among the one or more first phrases identified based on the vocabulary domain.

One important property of the above-noted loop is that, using the loop, the feature extraction engine 131 determines individual frequencies of shorter and more inclusive phrases before larger and less inclusive phrases. This means that, for example, the feature extraction engine 131 may determine the individual frequency of phrase AB before determining the individual frequency of the phrase ABC. By the time the feature extraction engine 131 determines the individual frequency of the phrase ABC, the feature extraction engine 131 at least knows an upper-bound on the individual frequency of ABC (e.g., the individual frequency of AB, since ABC wholly includes AB and thus IF(ABC) can in no event be larger than IF(AB)). This alone can improve efficiency of frequency determination, as the feature extraction engine 131 can terminate individual frequency determination for ABC and conclusively determine IF(ABC) without further text processing when the feature extraction engine 131 detects mth instance of ABC, where m=IF(AB).

Moreover, if feature extraction engine 131 stores an indication of locations in the indexed representation that AB occurs in (e.g., location identifiers for AB), the feature extraction engine 131 can retrieve those location identifiers and focus the text processing analysis on regions of the indexed representation determined based on the indexed representation identifiers. For example, if AB occurs at locations [11-12] and [100-101] within the indexed representation, the feature extraction engine 131 may be able to determine the individual frequency for ABC by inspecting only locations [13] and [102] to determine whether those locations include C. This further improves efficiency of individual frequency determination by potentially limiting the amount of text processing needed to determine individual frequencies of longer and less inclusive phrases.

Performing the optimizations noted above (e.g., optimizations relating to limiting amount of text processing needed to determine individual frequencies of longer phrases by using upper-bound individual frequencies and/or by using location identifiers) may require repeated storage and retrieval of values, such as individual frequencies of shorter phrases and/or location identifiers of shorter phrases. As discussed below, using hashed data structures to store such values may substantially reduce such storage and/or retrieval costs. Thus, an innovative aspect of the present invention relates to formulating tasks such as frequency determination and/or semantically-adjusted frequency adjustment in a manner that replaces certain computations in existing natural language processing solutions with intelligent inferences based on retrieving stored data. Because of the efficiency advantages provided by hashed data structures (and other data structures conducive to efficient storage and/or retrieval, such as constant-time or linear-time storage and/or retrieval), the formulation offered by the present invention can replace a range of more computationally complex text-processing operations with less computationally complex (e.g., constant or linear) storage and/or retrieval operations. This approach may, in turn, enable computationally efficient frequency determination and/or computationally efficient semantically-adjusted frequency adjustment. In this way, the formulation offered by the present invention can provide for computationally efficient natural language processing, e.g., real-time natural language processing.

At step/operation 502, the feature extraction engine 131 determines a location identifier for a first phrase (e.g., a phrase having a size equal to X). For example, the feature extraction engine 131 may generate a location identifier (e.g., a hashed value) for each phrase of the one or more first phrases using a hashing transformation (e.g., a transformation of a key associated with the phrase, such as the phrase identifier of the phrase determined by combining word identifiers of one or more words in the phrase, using a hashing function). For example, in the hash storage table 1200 depicted in the operational example of FIG. 12, each phrase identified in column 1201 is assigned a location identifier in column 1202.

At step/operation 503, the feature extraction engine 131 extract all occurrences of the first phrase in the indexed representation. In some embodiments, the feature extraction engine 131 identifies an ordered combination of one or more terms in the phrase. For example, the feature extraction engine 131 may determine that the phrase "low blood pressure" includes the ordered combination of terms "low," "blood," and "pressure." Afterward, the feature extraction engine 131 determines a phrase identifier for the phrase, e.g., by combining the word identifier for the one or more terms in the phrase in accordance with the ordered combination of the one or more terms in the phrase. For example, in the operational example of FIG. 6, given that the phrase low blood pressure is associated with an ordered combination of the words "low," "blood," and "pressure;" the word "low" has a word identifier 611; the word "blood" has a word identifier 612, and the word "pressure" has a word identifier 613, the feature extraction engine 131 may determine that phrase "low blood pressure" (e.g., associated with the ordered combination low+blood+pressure) has a phrase identifier 611 612 613. Thereafter, the feature extraction engine 131 extracts all occurrences of the phrase identifier in the indexed representation of the natural language object. For example, the feature extraction engine 131 may determine that the phrase "low blood pressure" occurs once in the indexed representation 750 of FIG. 7B, because the indexed representation includes only one instance of "611 612 613." To determine occurrence of the parameter identifier in the indexed representation, the feature extraction engine 131 may use a pattern matching algorithm.

At step/operation 503, the feature extraction engine 131 determines a count of all occurrences of the first phrase in the indexed representation. For example, as depicted in the phrase data table 800 of FIG. 8, column 801 identifies phrases, column 802 identifies phrase identifiers for the phrases, and column 803 identifies individual occurrence counts for the phrases. Each row of the phrase data table 800 corresponds to a different phrase. For example, as indicated by the second non-header row of the phrase data table 800, phrase "blood pressure" with a phrase identifier 611612 has an occurrence count of one in the indexed representation 750 of FIG. 7B, while, as indicated by the eighth non-header row of the phrase data table 800, phrase "diabetes" with a phrase identifier 608 has an occurrence count of two in the indexed representation 750 of FIG. 7B.

At step/operation 504, the feature extraction engine 131 determines whether the first phrase is a dominant phrase based on whether the count of all occurrences of the first phrases exceeds a frequency threshold value. In various embodiments, by identifying phrases whose individual frequency does not exceed a threshold and removing those phrases from further analysis, the feature extraction engine 131 can focus its feature extraction and/or predictive analysis on the most frequently repeated phrases and avoid processing less significant phrases. Thus, in various embodiments, it is crucial to select the threshold value in a manner that maximizes inclusion of significant phrases in the dominant phrase category but minimizes inclusion of insignificant phrases in the dominant phrase category. This is because, to the extent significant phrases are excluded from the dominant phrase category, accuracy of natural language processing may suffer; on the other hand, to the extent insignificant phrases are included in the noted category, efficiency of natural language processing may suffer. In some embodiments, the feature extraction engine 131 may determine the threshold value used for filtering the first phrases based on a property (e.g., content type, author identifier, originating institution identifier, size, etc.) associated with the natural language object. In some embodiments, determining dominant phrases includes filtering the first phrases in ways in addition to and/or instead of determining whether the individual frequency of each first phrase among the one or more first phrases exceeds a threshold value.

At step/operation 505, the feature extraction engine 131 stores an individual frequency for each dominant phrase based on the location identifier for the dominant phrase. In some embodiments, the feature extraction engine 131 determines an individual frequency for each dominant phrase based on the count of all occurrences of the dominant phrase in the indexed representation. The feature extraction engine 131 may, for example, store the individual frequency for a dominant phrase in a hashed data structure based on the location identifier for the dominant phrase. Storing individual frequencies for dominant phrases using hashed data structures is explained in greater detail below with reference to FIGS. 12-13.

The individual frequency for a phrase may indicate a count of occurrences of the term in the natural language object. In some embodiments, the feature extraction engine 131 may apply a weighing parameter to a raw count of occurrences of a term in the natural language object to generate the individual frequency. The weighing parameter (e.g., a trained parameter) may be a value determined based on system configuration data stored in the storage subsystem 108 and/or determined using a machine learning system (e.g., a machine learning system that analyzes writing style of an author or originating institution associated with the natural language object).

Returning to FIG. 4, at step/operation 404, the feature extraction engine 131 determines semantically-adjusted frequencies for each dominant phrase of one or more dominant phrases identified in the natural language object. In some embodiments, the feature extraction engine 131 identifies, for each dominant phrase, any dependent phrases for the dominant phrase. The feature extraction engine 131 may determine one or more semantic dependencies between the one or more dominant phrases (e.g., based on lexical dependencies between those dominant phrases) and use those semantic dependencies to determine, for each dominant phrase, whether the dominant phrase has any one or more dependent term relationships. In some embodiments, a dependent phrase for a dominant phrase is a phrase from the one or more dominant phrases that includes the dominant phrase (e.g., includes, as part of its ordered combination of terms, the ordered combination of terms characterizing the dominant phrase) but is larger in size than the dominant phrase (e.g., where the size of a phrase is determined based on a number of phrases in the ordered combination of terms in the phrase). For example, the feature extraction engine 133 may deem the following phrases to be dependent phrases for the phrase "blood" (of size one): "blood pressure" (of size two) and "low blood pressure" (of size 3). On the other hand, if the dominant phrases include those three phrases only, the feature extraction engine 133 may determine that the phrase "low blood pressure" does not have any dominant phrases that are dependent on it.

As another example, if the one or more dominant phrases for a natural language object include the phrases that are members of the set {A, B, C, AB, BA, ABC}, where each capital letter is a term and each set member is a phrase (with the order of the alphabetic letters in the set member indicating the ordered combination of terms in the noted phrase), the feature extraction engine 131 may determine the following semantic relationship conclusions from the noted set of dominant phrases (where α←{β, θ} indicates both that β is dependent on α and θ is dependent on α, with α, β, θ each being a phrase of size one or more): A←{AB, BA, ABC}; B←{AB, BA, ABC}; C←{ABC}; AB←{ABC}; BA←{null}; ABC←{null}.

In some embodiments, the steps/operations performed as 404 of FIG. 4 are represented in more detail in FIG. 9. At step/operation 901, the feature extraction engine 131 creates a graph where each dominant phrase in the natural language object is a node in the graph. At step/operation 902, the feature extraction engine connects a directed edge from each first node for a first phrase to each second node for a second phrase if the first phrase is neighbor phrase for the first phrase. The neighbor phrase for a selected dominant phrase may be a dependent phrase that has a direct semantic relationship with the selected dominant phrase.

For example, in the semantic relationship graph 1000 depicted in the operational example of FIG. 10, phrase AB 1005 is a neighbor phrase for phrase A 1001 and phrase B 1002. This is because phrase AB 1005 is a dependent phrase for both phrase A 1001 and phrase B 1002, and has a direct relationship to both phrases. In contrast, phrase ABC 1007 is not a neighbor phrase for either phrase A 1001 or phrase B 1002. This is because, while phrase ABC 1007 is a dependent phrase for both phrase A 1001 and phrase B 1002, phrase ABC 1007 does not have a direct relationship with either phrase A 1001 or phrase B 1002. As another example, in the sematic relationship graph 1000, phrase BC 1006 is a neighbor phrase for phrase C 1003. As yet another example, phrase D 1004 does not have any neighbor phrases. In general, in the semantic relationship graph 1000, the following neighbor relationships exist (where α: {β, θ} indicates that {β, θ} is the set of all neighbor phrases for α, with α, β, θ each being a phrase of size one or more): A: {AB}; B: {AB, BC}; C: {BC}; D: {null}; AB: {ABC}; BC: {ABC}; and ABC: {null}.

At step/operation 903, the feature extraction engine 131 determines a semantically-adjusted frequency for each dominant phrase by subtracting the individual frequency for the dominant phrase from the individual frequency for each of any neighbor phrases for the dominant phrase. Step/operation 903 may be performed for each phrase of size Y, where Y takes an initial value of N and gets decremented as all semantically-adjusted frequencies for all dominant phrases of size Y are calculated. The value of N may be a size of a longest phrase among the one or more first phrases identified based on the vocabulary domain or a size of the longest dominant phrase among the one or more dominant phrases.

An example implementation of step/operation 902 is depicted in FIG. 11, which provides an operational example of a semantic adjustment table 1100. The semantic adjustment table has a column 1101 which includes particular dominant phrases, a column 1102 which includes sizes for the particular dominant phrases, a column 1103 which includes any neighbor phrases for the dominant particular phrases, a column 1104 which includes the individual frequencies for the dominant particular phrases, and a column 1105 which includes the semantically-adjusted frequencies for particular dominant phrases. Each row of the semantic adjustment table corresponds to a particular dominant phrase of the particular dominant phrases.

The feature extraction engine 131 may use an incomplete version of the semantic adjustment table 1100 (e.g., without column 1105) to determine semantically-adjusted frequencies for the dominant phrases. For example, at a first iteration (e.g., X=3), the feature extraction engine 131 may identify phrase ABC as the only selected dominant phrase having size X; identify that phrase ABC has no neighbor phrases; and thus adopt the individual frequency for phrase ABC as the semantically-adjusted frequency for the phrase ABC. Then, the feature extraction engine 131 may decrement X.

At a second iteration of the routine 911 (e.g., X=3−1=2), the feature extraction engine 131 may identify that phrases AB and BC have size X For phrase AB, the feature extraction engine 131 may determine that phrase AB has a neighbor phrase in phrase ABC. Thus, feature extraction engine 131 may determine the semantically-adjusted frequency for phrase ABC by subtracting the individual frequency for ABC from the individual frequency for phrase AB. For the remaining phrase BC, the feature extraction engine 131 may determine that phrase BC has a neighbor phrase in phrase ABC. Thus, feature extraction engine 131 may determine the semantically-adjusted frequency for phrase ABC by subtracting the individual frequency for ABC from the individual frequency for phrase BC. Afterward, the feature extraction engine 131 may decrement X.

At a third and final iteration of the routine 911 (e.g., X=2−1=1), the feature extraction engine 131 may identify that phrases A, B, C, and D have size X For phrase A, the feature extraction engine 131 may determine that phrase A has a neighbor phrase in phrase AB. Thus, feature extraction engine 131 may determine the semantically-adjusted frequency for phrase A by subtracting the individual frequency for AB from the individual frequency for phrase A. For phrase B, the feature extraction engine 131 may determine that phrase B has two neighbor phrases in phrases AB and BC. Thus, feature extraction engine 131 may determine the semantically-adjusted frequency for phrase B by subtracting the individual frequency for both AB and BC (e.g., a combination of the individual frequency for AB and the individual frequency for BC) from the individual frequency for phrase B. For phrase C, the feature extraction engine 131 may determine that phrase C has a neighbor phrase in phrase BC. Thus, feature extraction engine 131 may determine the semantically-adjusted frequency for phrase C by subtracting the individual frequency for BC from the individual frequency for phrase C. Finally, for phrase D, the feature extraction engine 131 may determine that phrase D has no neighbor phrases. Thus, the feature extraction engine may adopt the individual frequency for phrase D as the semantically-adjusted frequency for the phrase D. Then, the feature extraction engine 131 may decrement X Because the decremented X now equals zero, the process 900 terminates.

To perform semantic adjustment of individual frequencies, the feature extraction engine 131 may perform numerous storage and retrievals of frequency values, such as individual frequency values and/or semantically-adjusted frequency values. As discussed above, such storage and retrieval can be performed in data structures that enable computationally efficient storage and/or retrieval, such as hashed data structures. For example, the feature extraction engine 131 may generate a location identifier (e.g., a hashed value) for each phrase of the one or more dominant phrases using a hashing transformation (e.g., a transformation of a key associated with the phrase, such as the phrase identifier of the phrase, using a hashing function); and store the individual frequency for each phrase of the one or more dominant phrases based on with the location identifier for the fourth phrase. In some embodiments, the feature extraction engine 131 may further retrieve the individual frequency for each phrase of the one or more dominant phrases based on the phrase identifier for the fifth phrase.

FIGS. 12-13 provide operational examples of storing individual frequencies for dominant phrases in a hashed data structure. In the hash storage table 1200 depicted in the operational example of FIG. 12, each phrase identified in column 1201 and associated with an individual frequency in column 1203 is assigned a location identifier in column 1202. In the storage media 1300 depicted in operational example of FIG. 13, the individual frequencies of column 1203 are stored in accordance with location identifiers of column 1202. For example, the individual frequency of 20 for phrase A is stored in memory/data structure 1 1301 of the storage media 1300; the individual frequency of 20 for phrase B is stored memory/data structure 5 1305 of the storage media 1300; the individual frequency of 40 for phrase C is stored in memory/data structure 3 1303 of the storage media 1300; the individual frequency of 10 for phrase D is stored in memory/data structure 4 1304 of the storage media 1300; the individual frequency of 5 for phrase AB is stored in memory/data structure 2 1302 of the storage media 1300; and the individual frequency of 7 for phrase ABC is stored in memory/data structure 7 1307 of the storage media 1300. The location identifier 1* noted in column 1202 of hash storage table 1200 indicates that the individual frequency of 8 for phrase BC is stored as the second value in memory/data structure 1 1301 of the storage media 1300. As depicted in FIG. 13, the feature extraction engine 131 may store the individual frequency for phrase BC in a location outside memory/data structure 1 1301 (e.g., memory location 98), and instead store a reference to the location outside memory/data structure 1 1301 in the second memory location of the memory/data structure 1 1301. This is one way in which hashed data structures handle issues arising from generating shared hash values for different keys. One of ordinary skill in the art will recognize that other solutions may be available.

The feature extraction engine 131 may store some or all frequency data in hashed data structures in the manner depicted in FIGS. 12-13. For example, the feature extraction engine 131 may generate a location identifier for a phrase using a hash transformation and store the individual frequency for the phrase in accordance with the location identifier. As another example, the feature extraction engine may retrieve a phrase by retrieving the location identifier for the phrase term from the hash storage table 1200 and accessing the storage media 1300 in accordance with the retrieved location identifier. Storing and retrieving data using a hashed data structure, e.g., in the manner depicted in the operational examples of FIGS. 13-14, may enable the feature extraction engine 131 to perform storage and retrieval of frequency values with increased speed. This, in turn, can increase the speed of natural language processing by the data analytics system 105. As a result, the data analytics system 105 will be able to provide faster and/or more efficient processing of natural language objects, such as real-time processing of natural language objects.

Returning to FIG. 5, at step/operation 405, the feature extraction engine 131 generates a structured representation of the natural language object based on each semantically-adjusted frequency associated with a dominant term of the one or more dominant terms. For example, the feature extraction engine 131 may determine one or more features for the natural language object based on each semantically-adjusted frequency and combine those features to generate the structured representation. In some embodiments, the structured representation may include a feature value for one or more predictive terms, where the one or more predictive terms include (e.g., exclusively) the one or more first terms identified based on the vocabulary domain and/or the one or more dominant terms. In some embodiments, the structure of the structured representation (e.g., the predictive terms and/or an order of the predictive terms characterizing the structured representation) is defined by a structure of an expected input to the feature processing engine 132 and/or the feature prediction engine 133.

At step/operation 406, the feature extraction engine 131 performs the predictive analysis using the structured representation. In some embodiments, the steps/operations performed as 405 of FIG. 4 are represented in more detail in FIG. 14. At step/operation 1401, the feature extraction engine 131 identifies one or more natural language objects each having a structured representation (e.g., the structured representation generated at step/operation 405 for the natural language object identified at step/operation 401). At least some structured representations may have been generated by the feature extraction engine 131 in accordance with the process 400 of FIG. 4. The feature processing engine 132 may identify the natural language objects by receiving structured representations for the natural language objects from the feature extraction engine 131.

At step/operation 1402, the feature processing engine 132 may identify one or more predictive phrases. The predictive terms may define a structure for an expected input of the feature processing engine 132 and/or the feature prediction engine 133. For example, the feature processing engine 132 and/or the feature prediction engine 133 may expect inputs of size n, where each value in the input describes a property associated with presence of a particular predictive phrase of n predictive phrases in a natural language object. The predictive phrases may include the dominant phrases for a particular natural language object in addition to other predictive data phrases. Because the dominant phrases for a particular natural language object may define the character of the structured representation for the particular natural language object, to the extent the structured representation does not include values corresponding to any missing predictive phrases, the feature processing engine 132 may supplement the structured representation with missing values, e.g., with default values such as zero.

In some embodiments, the feature processing engine 132 may generate an aggregate structured representation based on the predictive terms and each structured representation for a natural language objects of the one or more natural language objects. Each value in the aggregate structured representation may correspond to at least one of the predictive terms and may be determined based on at least one value from at least one structured representation for a natural language object. For example, FIG. 15 provides an operational example of an aggregate structured representation 1500. In the example aggregate structured representation 1500 each row corresponds to a natural language object and each column corresponds to a predictive term interpretation. Thus, each value in the aggregate structured representation 1500 may describe a property associated with presence of a particular predictive phrase in a natural language object.

At step/operation 1403, the feature processing engine 132 identifies one or more phrase parameters, where each phrase parameter of the one or more phrase parameters is associated with a predictive phrase of the one or more predictive phrases. Each phrase parameter for a phrase may indicate a predictive significance of the phrase. The feature processing engine 132 may retrieve at least some of the phrase parameters from the storage subsystem 108.

At step/operation 1404, the feature processing engine 132 processes the structured representations of the one or more natural language objects in accordance with the one or more phrase parameters to generate a parameterized representation of the one or more natural language objects. In some embodiments, the feature processing engine 132 may apply one or more (linear and/or non-linear) operations on a matrix of the aggregate structured representation and a column vector of phrase parameters to generate a matrix of parameterized semantically-adjusted frequencies. For example, the feature processing engine 132 may multiply an aggregate structured representation matrix by a phrase parameter vector, such that each value in the matrix corresponding to a particular predictive phrase is multiplied by the value in the vector corresponding to the particular predictive term, to generate a matrix of parameterized semantically-adjusted frequencies.

At step 1405, the feature prediction engine 133 processes the parameterized representation to generate one or more predictions. For example, the prediction engine may process the parameterized representation using a machine learning framework having one or more trained parameters, such as at least one of a logistic regression machine learning mechanism and/or a regularized regression machine learning mechanism, e.g., a Least Absolute Shrinkage and Selection Operator (LASSO) machine learning mechanism. The feature prediction engine 133 may retrieve at least some parameters of its machine learning system from the system configuration data stored in the storage subsystem 108. The feature prediction engine 133 may be trained using the training data stored in the storage subsystem 108.

The feature prediction engine 133 may predict one or more predictions about patient health and/or about completeness of a medical note document. For example, the feature prediction engine 133 may process one or more natural language objects each corresponding to a medical note document related to a first patient to determine a prediction and/or diagnosis about health condition of the first patient. Based on the determined prediction and/or diagnosis, the feature prediction engine 133 may cause one or more recommendations (e.g., real-time recommendations) for prescription of particular drugs, scheduling of particular procedures, scheduling of particular tests, scheduling of particular visitations, etc. As another example, the feature prediction engine 133 may determine that a newly entered medical notes document misses particular necessary information. Based on the noted determination, the feature prediction engine 133 may cause recommendations (e.g., real-time recommendations) for entry of such missing information.

V. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

For example, the foregoing description provides various examples of utilizing systems and methods for monitoring cognitive capability of a user. However, it should be understood that various embodiments of the systems and methods discussed herein may be utilized for providing reminders of any activity, such as exercising, eating healthy snacks, performing a particular task, calling another individual, and/or the like.

The invention claimed is:
1. A computer-implemented method comprising:
 identifying, by one or more processors, an indexed representation of a first natural language data object;
 identifying, by the one or more processors, a low-occurrence phrase in the indexed representation;

identifying, by the one or more processors and for the low-occurrence phrase, a label phrase, a low-occurrence phrase identifier, and a label phrase identifier for the label phrase;

updating, by the one or more processors, the indexed representation by replacing the low-occurrence phrase identifier with the label phrase identifier;

determining, by the one or more processors, an individual frequency for each of one or more dominant phrases in the first natural language data object;

determining, by the one or more processors, a semantically-adjusted frequency for a first dominant phrase of the one or more dominant phrases based at least in part on the individual frequency for the first dominant phrase and an individual frequency for a dependent phrase for the first dominant phrase, wherein, when the first dominant phrase is associated with the dependent phrase: (i) the first dominant phrase comprises the dependent phrase and is larger in size than the dependent phrase, and (ii) the dependent phrase is a second dominant phrase of the one or more dominant phrases;

generating, by the one or more processors, a first structured representation of the first natural language data object based at least in part on a semantically-adjusted frequency associated with a third dominant phrase of the one or more dominant phrases;

providing, by the one or more processors, at least a portion of the first structured representation as input to a machine learning model;

generating, by the one or more processors and using the machine learning model, a prediction corresponding to the first natural language data object; and providing, by the one or more processors, the prediction to an end user computing entity, wherein the prediction is displayed by the end user computing entity.

2. The computer-implemented method of claim 1, wherein determining an individual frequency for each of one or more dominant phrases in the first natural language data object comprises:

obtaining a vocabulary domain associated with the first natural language data object, wherein the vocabulary domain is associated with one or more first phrases;

determining an individual frequency for each first phrase of the one or more first phrases based at least in part on a count of occurrences of the first phrase in the indexed representation of the first natural language data object, and identifying, based at least in part on each individual frequency associated with a first phrase of the one or more first phrases, one or more dominant phrases of the one or more first phrases.

3. The computer-implemented method of claim 2, wherein determining each individual frequency comprises:

identifying a first value, wherein the first value is initially configured to be one;

identifying a second value, wherein the second value is initially configured to be a first preconfigured value more than one; and in response to determining that the first value is lower than the second value, iteratively performing operations comprising:

(a) identifying one or more selected first phrases among the one or more first phrases, wherein each selected first phrase of the one or more selected first phrases has a size equal to the first value;

(b) determining the individual frequency for each selected first phrase; and (c) updating the first value by incrementing the first value.

4. The computer-implemented method of claim 2, further comprising:

generating a location identifier for each first phrase of the one or more first phrases using a hash transformation; and storing the individual frequency for each first phrase of the one or more first phrases based at least in part on with the location identifier for the first phrase.

5. The computer-implemented method of claim 4, further comprising:

retrieving the individual frequency for each first phrase of the one or more first phrases based at least in part on the location identifier for the first phrase.

6. The computer-implemented method of claim 2, wherein identifying the one or more dominant phrases comprises:

identifying one or more second phrases of the one or more first phrases, wherein each individual frequency for a second phrase of the one or more second phrases exceeds a threshold value; and identifying the one or more dominant phrases based at least in part on the one or more second phrases.

7. The computer-implemented method of claim 2, wherein obtaining the indexed representation comprises:

identifying one or more first words in the first natural language data object;

determining a first word identifier for each first word of the one or more first words; and generating the indexed representation based at least in part on each first word identifier for a first word of the one or more first words.

8. The computer-implemented method of claim 7, wherein determining the individual frequency for a first phrase of the one or more phrases comprises:

identifying an ordered combination of one or more second terms identifiers in the first phrase;

determining, based at least in part on the ordered combination, a phrase identifier for the first phrase; and determining a count of occurrences of the phrase identifier in the indexed representation.

9. The computer-implemented method of claim 1, wherein determining each semantically-adjusted frequency comprises:

identifying a third value, wherein the third value is initially configured to be a second preconfigured value;

identifying a fourth value, wherein the fourth value is configured to be one; and in response to determining that the third value is higher than the fourth value, iteratively performing operations comprising:

(a) identifying one or more selected dominant phrases of the one or more dominant phrases, wherein each selected dominant phrase of the one or more dominant phrases has a size equal to third value;

(b) for each selected dominant phrase of the one or more selected dominant phrases that has at least one dependent phrase, identifying, from one or more dependent phrases for the selected dominant phrase, one or more neighbor phrases for the selected dominant phrase, wherein each neighbor phrase of the one or more neighbor dependent phrases has a direct semantic relationship with the selected dominant phrase based at least in part on a semantic relationship graph associated with the one or more dominant phrases;

(c) for each selected dominant phrase of the one or more selected dominant phrases, determining the semantically-adjusted frequency for the selected dominant phrase by subtracting the individual frequency for the selected dominant phrase by any individual frequencies for any neighbor phrases for the selected dominant phrase; and (d) updating the third value by decrementing the third value.

10. The computer-implemented method of claim 1, wherein generating the prediction corresponding to the first natural language data object comprises:
identifying a plurality of natural language objects, wherein the one or more natural language objects comprise the first natural language data object and one or more second natural language objects, and each second natural language object of the one or more second natural language objects is associated with a second structured representation of one or more structured representations;
identifying one or more predictive phrases;
identifying one or more phrase parameters, wherein each phrase parameter of the one or more phrase parameters is associated with a predictive phrase of the one or more predictive phrases;
processing the first structured representation and the one or more second structured representations in accordance with the one or more phrase parameters to generate a parameterized representation of the one or more natural language objects; and
processing the parameterized representation to generate one or more predictions.

11. An apparatus comprising one or more processors and at least one non-transitory memory comprising program code, wherein the at least one non-transitory memory and the program code are configured to, with the one or more processors, cause the apparatus to:
identify an indexed representation of a first natural language data object;
identify a low-occurrence phrase in the indexed representation;
identify, for the low-occurrence phrase, a label phrase, a low-occurrence phrase identifier, and a label phrase identifier for the label phrase;
update the indexed representation by replacing the low-occurrence phrase identifier with the label phrase identifier;
determine an individual frequency for each of one or more dominant phrases in the first natural language data object;
determine a semantically-adjusted frequency for a first dominant phrase of the one or more dominant phrases based at least in part on the individual frequency for the first dominant phrase and an individual frequency for a dependent phrase for the first dominant phrase, wherein, when the first dominant phrase is associated with the dependent phrase: (i) the first dominant phrase comprises the dependent phrase and is larger in size than the dependent phrase, and (ii) the dependent phrase is a second dominant phrase of the one or more dominant phrases;
generate a first structured representation of the first natural language data object based at least in part on a semantically-adjusted frequency associated with a third dominant phrase of the one or more dominant phrases;
provide at least a portion of the first structured representation as input to a machine learning model;
generate, using the machine learning model, a prediction corresponding to the first natural language data object; and
provide the prediction to an end user computing entity, wherein the prediction is displayed by the end user computing entity.

12. The apparatus of claim 11, wherein determining an individual frequency for each of one or more dominant phrases in the first natural language data object comprises:
obtaining a vocabulary domain associated with the first natural language data object, wherein the vocabulary domain is associated with one or more first phrases;
determining an individual frequency for each first phrase of the one or more first phrases based at least in part on a count of occurrences of the first phrase in the indexed representation of the first natural language data object, and
identifying, based at least in part on each individual frequency associated with a first phrase of the one or more first phrases, one or more dominant phrases of the one or more first phrases.

13. The apparatus of claim 12, wherein determining each individual frequency comprises:
identifying a first value, wherein the first value is initially configured to be one;
identifying a second value, wherein the second value is initially configured to be a first preconfigured value more than one; and
in response to determining that the first value is lower than the second value, iteratively performing operations comprising:
(a) identifying one or more selected first phrases among the one or more first phrases, wherein each selected first phrase of the one or more selected first phrases has a size equal to the first value;
(b) determining the individual frequency for each selected first phrase; and
(c) updating the first value by incrementing the first value.

14. The apparatus of claim 12, wherein the at least one non-transitory memory and the program code are further configured to, with the one or more processors, cause the apparatus to:
generate a location identifier for each first phrase of the one or more first phrases using a hash transformation; and
store the individual frequency for each first phrase of the one or more first phrases based at least in part on with the location identifier for the first phrase.

15. The apparatus of claim 12, wherein identifying the one or more dominant phrases comprises:
identifying one or more second phrases of the one or more first phrases, wherein each individual frequency for a second phrase of the one or more second phrases exceeds a threshold value; and
identifying the one or more dominant phrases based at least in part on the one or more second phrases.

16. The apparatus of claim 11, wherein determining each semantically-adjusted frequency comprises:
identifying a third value, wherein the third value is initially configured to be a second preconfigured value;
identifying a fourth value, wherein the fourth value is configured to be one; and
in response to determining that the third value is higher than the fourth value, iteratively performing operations comprising:

(a) identifying one or more selected dominant phrases of the one or more dominant phrases, wherein each selected dominant phrase of the one or more dominant phrases has a size equal to third value;

(b) for each selected dominant phrase of the one or more selected dominant phrases that has at least one dependent phrase, identifying, from one or more dependent phrases for the selected dominant phrase, one or more neighbor phrases for the selected dominant phrase, wherein each neighbor phrase of the one or more neighbor dependent phrases has a direct semantic relationship with the selected dominant phrase based at least in part on a semantic relationship graph associated with the one or more dominant phrases;

(c) for each selected dominant phrase of the one or more selected dominant phrases, determining the semantically-adjusted frequency for the selected dominant phrase by subtracting the individual frequency for the selected dominant phrase by any individual frequencies for any neighbor phrases for the selected dominant phrase; and (d) updating the third value by decrementing the third value.

17. A non-transitory computer storage medium comprising instructions configured to cause one or more processors to:

identify an indexed representation of a first natural language data object;

identify a low-occurrence phrase in the indexed representation;

identify, for the low-occurrence phrase, a label phrase, a low-occurrence phrase identifier, and a label phrase identifier for the label phrase;

update the indexed representation by replacing the low-occurrence phrase identifier with the label phrase identifier;

determine an individual frequency for each of one or more dominant phrases in the first natural language data object;

determine a semantically-adjusted frequency for a first dominant phrase of the one or more dominant phrases based at least in part on the individual frequency for the first dominant phrase and an individual frequency for a dependent phrase for the first dominant phrase, wherein, when the first dominant phrase is associated with the dependent phrase: (i) the first dominant phrase comprises the dependent phrase and is larger in size than the dependent phrase, and (ii) the dependent phrase is a second dominant phrase of the one or more dominant phrases;

generate a first structured representation of the first natural language data object based at least in part on a semantically-adjusted frequency associated with a third dominant phrase of the one or more dominant phrases;

provide at least a portion of the first structured representation as input to a machine learning model;

generate, using the machine learning model, a prediction corresponding to the first natural language data object; and provide the prediction to an end user computing entity, wherein the prediction is displayed by the end user computing entity.

* * * * *